US005148159A

United States Patent [19]

Clark et al.

[11] Patent Number: 5,148,159

[45] Date of Patent: Sep. 15, 1992

[54] REMOTE CONTROL SYSTEM WITH TEACH/LEARN SETTING OF IDENTIFICATION CODE

[75] Inventors: John Clark, Ann Arbor; Brian J. Martel, Walled Lake; James S. Murray, Redford, all of Mich.

[73] Assignee: Stanley Electronics, Novi, Mich.

[21] Appl. No.: 343,921

[22] Filed: Apr. 26, 1989

[51] Int. Cl.[5] .................... H04Q 1/00

[52] U.S. Cl. .................... 340/825.22; 340/825.69; 340/825.72; 358/194.1

[58] Field of Search .................... 340/825.44, 825.22, 340/825.52, 825.56, 825.69, 825.72, 311.1, 825.71; 341/176; 358/194.1, 382.5; 70/271; 358/382.5

[56] References Cited

U.S. PATENT DOCUMENTS

| | | | |
|---|---|---|---|
| 4,422,071 | 12/1983 | de Graaf | 340/825.44 |
| 4,529,980 | 7/1985 | Liotine et al. | 340/825.52 |
| 4,593,155 | 6/1986 | Hawkins | 179/2 |
| 4,623,887 | 11/1986 | Welles, II | 340/825.57 |
| 4,652,860 | 3/1987 | Weishaupt et al. | 340/825.22 |
| 4,665,397 | 5/1987 | Pinnow | 340/825.72 |
| 4,686,529 | 8/1987 | Kleefeldt | 340/825.69 |
| 4,703,359 | 10/1987 | Rumbolt et al. | 358/194.1 |
| 4,750,118 | 6/1988 | Heitschel et al. | 364/400 |
| 4,779,091 | 10/1988 | Oyagi et al. | 340/311.1 |
| 4,878,052 | 10/1989 | Schulze | 340/825.72 |
| 4,912,463 | 3/1990 | Li | 340/825.69 |

*Primary Examiner*—Donald J. Yusko
*Assistant Examiner*—Michael Horabik
*Attorney, Agent, or Firm*—Krass & Young

[57] ABSTRACT

The present invention is remote control system including one or moree portable units and a base unit which employs identifiction codes for security. The operator preferably can select the identification code for the base unit, preferably via a process yielding a random number, with a provision for selection of a predetermined reset code. The base unit teaches this identification code to a portable unit via mating asynchronous communication ports. The same identification code may be taught to plural portable units. This identification code is stored in a static random access memory in the portable units and in an electrically erasable read only memory in the base unit and this is not susceptible to determination by visual inspection. Each portable unit includes a capacitor for storing energy so that the battery, which ordinarily supplies electrical power to the portable unit, can be replaced without loss of the stored identification code. Each portable unit may have plural buttons and plural memories enabling a portable unit to operate a plurality of base units. This may also enable a single portable unit to control a plurality of operations of a single base unit.

24 Claims, 10 Drawing Sheets

REMOTE CONTROL SYSTEM WITH TEACH/LEARN SETTING OF IDENTIFICATION CODE

TECHNICAL FIELD OF THE INVENTION

The present invention is in the field of remote control systems having security codes, and in particular such remote control systems such as used in garage door operators having a manner for specification of the security code employed.

BACKGROUND OF THE INVENTION

Remote control systems for control of gates or garage door operators are known in the art. These systems ordinarily employ a security code. In a typical system each remote portable unit and each base unit has an operator specified security code. Each portable unit is capable of transmitting a signal encoded with the particular security code set therein. Likewise, each base unit is responsive only to signals including a security code corresponding to the security code set in that base unit. Thus a particular portable unit and base unit which are to be used together must have the same security code. This presence of a security code permits more than one remote control system employing the same radio frequency to be used in the same neighborhood. In particular, it is possible to permit a relatively large number of security codes thereby greatly decreasing the likelihood that another portable unit by the same manufacturer would unintentionally operate a particular base unit. In addition, this reduces the possibility of unauthorized entry by persons having knowledge of a particular manufacturer's technical characteristics.

The security code in both the portable unit and in the base unit must be match in order to support these security goals. It is known in the prior art to construct both the portable unit and the base unit having security codes which are operator selectable or operator alterable. In a typical remote control system of this type both the portable unit and the base unit would have their security codes set by a bank of switches. Such switches are typically embodied in miniature form in a dual in line package which is mounted on a circuit board in both the portable unit and in the base unit. A particular code is specified digitally depending upon the switch state of these switches. Selection of a particular security code involves the operator switching the bank of switches in both the portable unit and in the base unit to the same pattern, thereby specifying the same security code in each unit. Such remote control systems are typically sold in packages including one or more portable units and a single base unit. In order for the system to be initially operable upon installation, it is typical for each of the portable units and for the base unit to be set to a single factory preset code when first delivered to the purchaser. In this manner the system can be thoroughly tested to determine that it operates properly prior to the user selecting the particular security code to be used in his installation.

This manner of specifying the security code is not without its problems. Firstly, the typical dual in line switch banks employed are very small and difficult to manipulate. Typically it requires the use of some sort of stylus, such as a pencil point, in order to manipulate the switches because an individual finger is too large to select a single switch. This is thus a difficult and tedious procedure. In particular, because it is necessary to have the security codes in the portable units exactly match the security code in the base unit, errors in specifying the security code in the various units are likely to occur. This could occur due to the relatively small nature of the switches leading to confusion in recognition of exactly the code employed in each unit. In addition, it is possible to have one unit oriented incorrectly and therefore have the exact opposite code in the two units, even though the switches appear visually to have the same position.

This difficulty in selecting the particular security code in accordance with this typical prior art system leads to an additional problem. It has been found that many units returned from the field for repair have not been changed from the original factory preset code as they were delivered to the user. A base unit having such a security code is thus responsive to any newly purchased remote unit, virtually obviating the advantage of the security code system. It is believed that the difficulty in changing the security code is the reason why a significant portion of the units employed in the field are not changed from the factory preset code.

A further security difficulty results from the employment of this system for setting the security code. Because the security code can be visually read from the position of the switch bank, such a code is susceptible to unauthorized reading. Any person who has momentary access to one of the portable units can view this switch bank and determine the security code for that portable unit and the corresponding base unit. Because the typical use of such remote control systems is for garage door operators, the portable units are ordinarily stored in an automobile. Thus, anyone have momentary access to the automobile may be able to determine the particular security code of the garage where that automobile is ordinarily stored. Thus, for example, unscrupulous automobile repair facilities or service stations may use this method for entry for theft.

It is therefore a need in the art for a remote control operator systèm which overcomes these disadvantages. Such a system should have a relatively easy manner for setting the security code in both the base and in the portable units. In addition, such a remote control system should have a portable unit whose security code cannot be easily determined.

SUMMARY OF THE INVENTION

The present invention is remote control system including one or more portable units and a base unit. Each portable unit includes at least one control input and corresponding identification code memories. In the preferred embodiment in which the remote control system is employed as a remote garage door operator, the control inputs are manual momentary contact control push buttons. Upon receipt of a particular control input, the portable unit transmits a radio frequency signal modulated by an identification code recalled from the identification code memory corresponding to the control input. The base unit likewise has an identification code memory for storing a particular identification code. The base unit preferably also includes some manner permitting the user to specify the particular identification code.

The base unit includes a radio frequency receiver set to receive the radio frequency signal transmitted by the portable units. The base unit compares the identification code modulated on the received radio frequency signal with the identification code stored in the base unit identification code memory. The base unit performs a function, such as control of a garage door, only if the received radio frequency signal is encoded with an identification code which is identical to the identification code stored in the base unit.

Each of the portable units further includes an asynchronous communication port which mates with a similar asynchronous communication port in the base unit. The identification code for the system is selected as follows. The base unit and a particular portable unit are connected together via the mating asynchronous communication ports. Upon this connection, the base unit transmits data to the portable unit via the mating asynchronous communication ports corresponding to the particular identification code to which it is responsive. This data enables the portable unit to store the identification code in a particular identification code memory within the portable unit. The portable unit preferably includes a plurality of such identification code memories. The memory employed for storing the identification code received from the base unit corresponds to one of the control inputs, preferably a control input activated during the teach/learn process. Thereafter the portable unit and base unit are separated. Activation of this particular control input of the portable unit then enables recall of this taught identification code for transmission via the radio frequency transmitter, thus enabling the operation of the remote control system. The same identification code may be taught to additional portable units by similarly connecting these additional portable units to the base unit via the mating asynchronous ports and actuating a similar teaching process.

The identification code for the base unit may be preset upon manufacture or it may be operator selectable or operator alterable. In accordance with the preferred embodiment of the present invention the manner of selecting the identification code for the base unit is relatively easy for the operator. The base identification code is randomly set depending upon depression of a single push button at the base unit. Depression of this push button at the base unit starts a counter which is stopped upon release of this push button. The current count in the counter at this time specifies at least a portion of the base identification code. Thus the particular base identification code set depends upon the length of time which the operator holds this push button, and is not easily repeatable. In accordance with a further aspect of the preferred embodiment of the present invention, a second portion of the identification code is set by the time within a repetitive time cycle that the push button is released. Release of the push button starts a second counter counting. This second counter is stopped upon detection of the next following zero crossing of the 60 hertz AC power line. The two counts of these two counters are then concatenated to produce the identification code for the base unit. Because of this dual random system based upon both the length of time that the operator holds the push button and the exact moment in which the push button is released, the identification code thus selected is a true random number rather than merely a pseudo random number. Further, in accordance with the preferred embodiment of the present invention, this base identification code is stored with an electronic memory, of the type known as an electrically erasable programmable read only memory. The particular identification code is thus not susceptible to determination by visual inspection of the base unit.

In accordance with the present invention, the identification stored within each portable unit is stored within a static random access memory. This means that the identification code of the portable unit is likewise not susceptible to determination by visual inspection of the portable unit. In accordance with the preferred embodiment of the present invention, each portable unit includes a capacitor for storing energy so that the battery, which ordinarily supplies electrical power to the portable unit, can be replaced without loss of power to the static random access memory and therefore without loss of the identification code stored therein.

In accordance with a further aspect of the present invention, each portable unit includes a plurality of control push buttons, such as four, for entry of the control inputs and further includes corresponding identification code memories. Thus a single portable unit can be taught the identification codes of multiple base units. This permits a single portable unit to operate a plurality of base units. This may also enable a single portable unit to control a plurality of operations of a single base unit.

A further aspect of the present invention involves the use of a factory preset code. The operator is able to reset each of the identification codes within each portable unit and/or the identification code stored within the base unit to this factory preset code. This enables the portable and base units to be set on a particular known code which may be required, for example, for trouble shooting of any problems in the remote control system.

As thus described, the remote control system of the present invention enables enhanced security over that of the prior art. In particular, the ease of specification of the base unit identification code and the manner of teaching this identification code to the portable unit ensures a greater likelihood that the user will select an identification code other than the factory preset code. In addition, the manner in which the identification code is stored within these units makes the identification code not susceptible to determination by visual inspection.

BRIEF DESCRIPTION OF THE DRAWINGS

These and other aspects and features of the present invention will become clear from the foregoing description of the invention taken in conjunction with the drawings in which.

DETAILED DESCRIPTION OF THE PREFERRED EMBODIMENT

Figure 1:
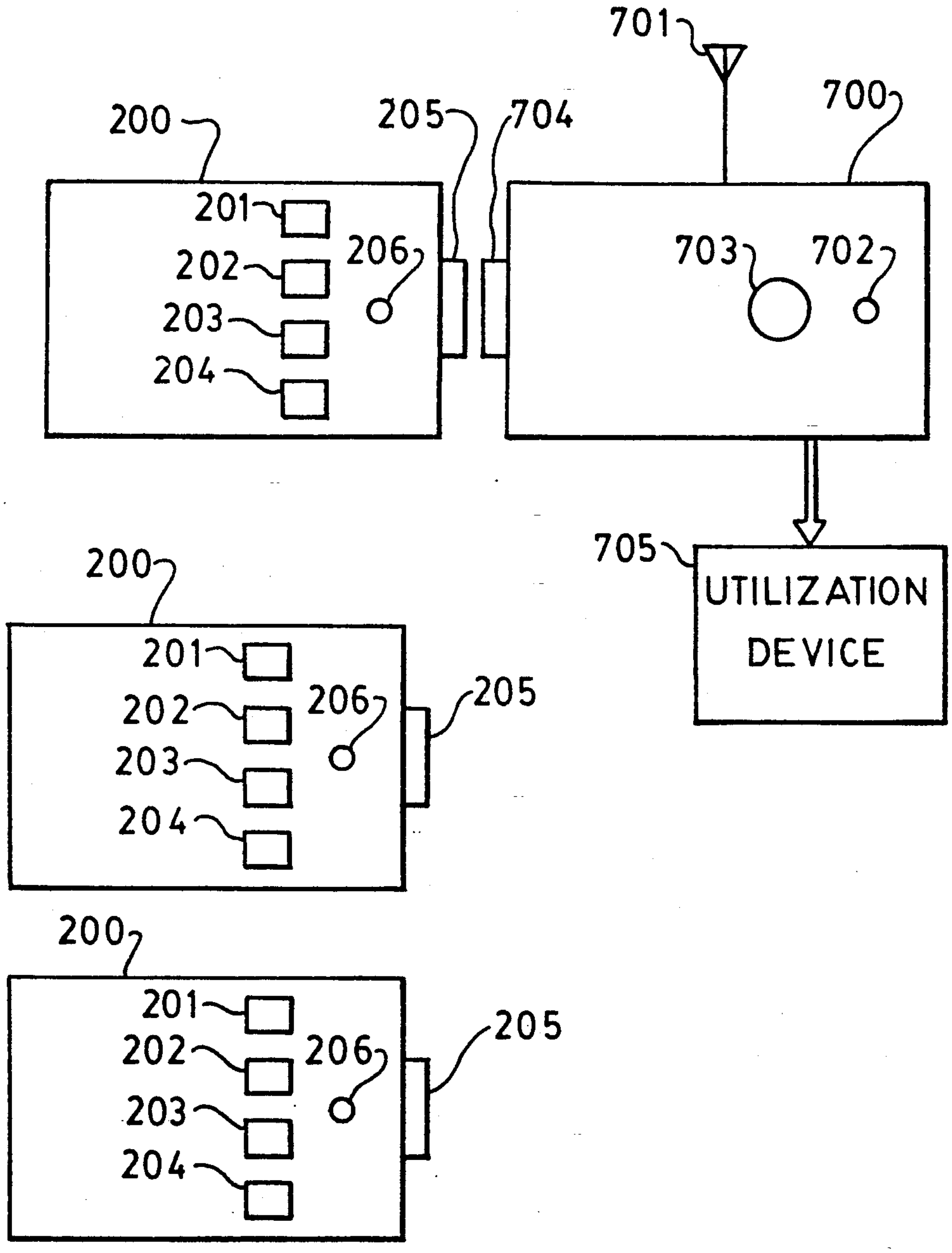
FIG. 1 is an illustration of the remote control system of the present invention including a plurality of portable units and a single base unit.

FIG. 1 illustrates the remote control system in accordance with the preferred embodiment of the present invention including a plurality of portable units 200 and a single base unit 700. Each portable unit 200 includes four control buttons: control buttons 201, 202, 203 and 204. Each of these control buttons is preferably a momentary contact push button switch. Similarly, each portable unit 200 includes an asynchronous communication port 205. Each portable unit 200 likewise includes a signaling light emitting diode 206, which signals to the operator the operation of the portable unit. Not shown in FIG. 1 is a hidden reset switch which enables resetting of one or more of the memories of the portable unit 200. Also not shown in FIG. 1 is a hidden antenna for transmission of the radio frequency remote control signal. This antenna is contained within portable unit 200 in accordance with the prior art.

Base unit 700 is responsive to radio frequency signals transmitted by one of the portable units 200. These radio frequency signals are received via antenna 701. The base unit 700 further includes a signaling light emitting diode 702 which signals the combined memory reset/identification code specification operation of base unit 700. Base unit 700 includes a single momentary contact push button switch 703 which is employed to activate the combined reset/identification code selection operation. Base unit 700 includes asynchronous communication port 704 which is adapted for mating with each of the asynchronous communication ports 205 of the portable units 200. In a manner which will be more fully described below, base unit 700 is enabled to transmit its identification code to a portable unit 200 via the mating asynchronous communication ports 205 and 704. This enables the portable unit 200 to store this identification code within one of its memories. Lastly, base unit 700 is coupled to utilization device 705. Thus base unit 700 is permitted to transmit control signals to utilization device 705. In accordance with the preferred embodiment of the present invention, utilization device 705 is an automatic garage door operator. Thus each portable unit 200 can control the garage door operation. As will be further described below, an automatic garage door operator is merely an example of a utilization device 705 which may be controlled by this system.

Figure 2:
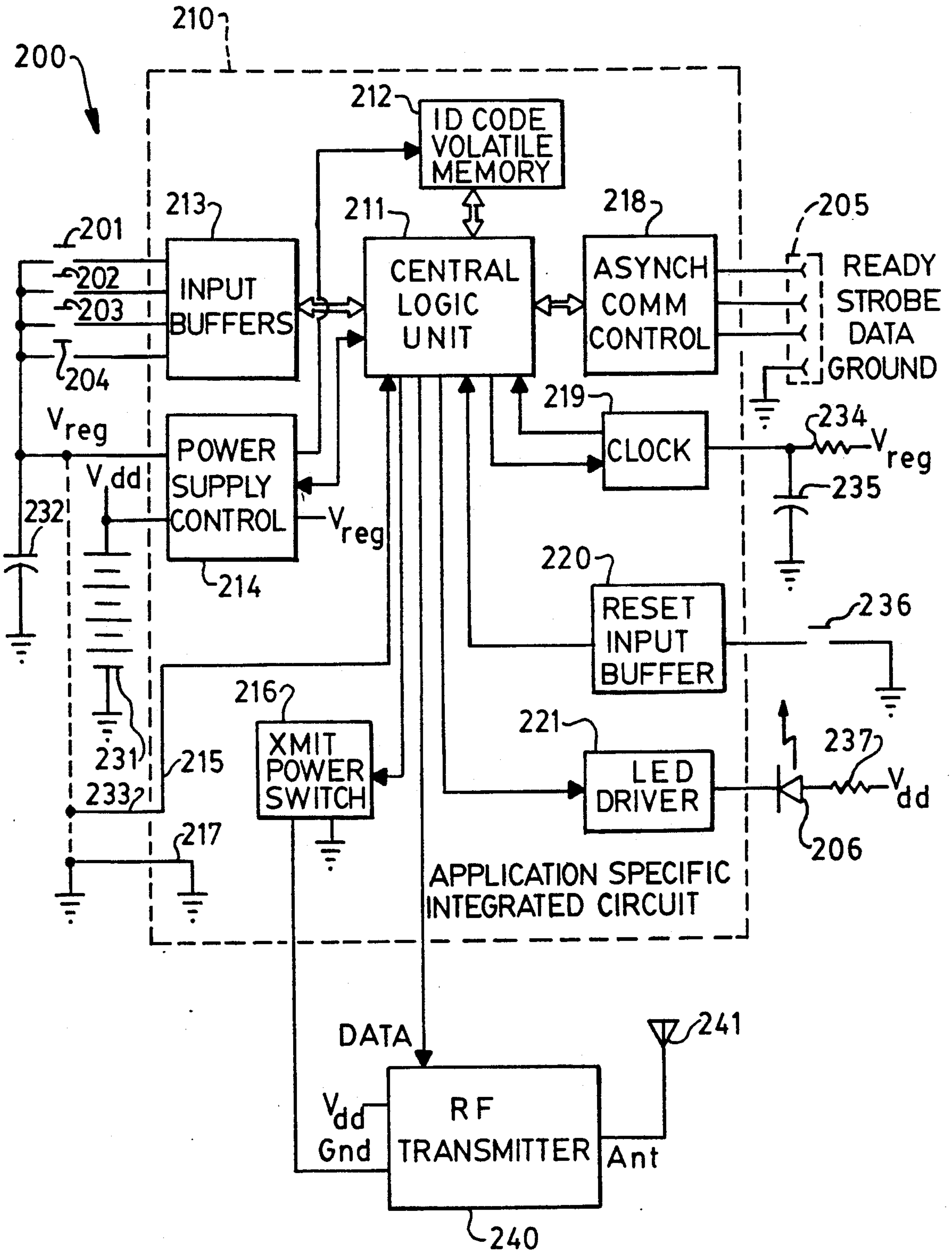
FIG. 2 is a block diagram of the circuit of one of the portable units.
Figure 5:
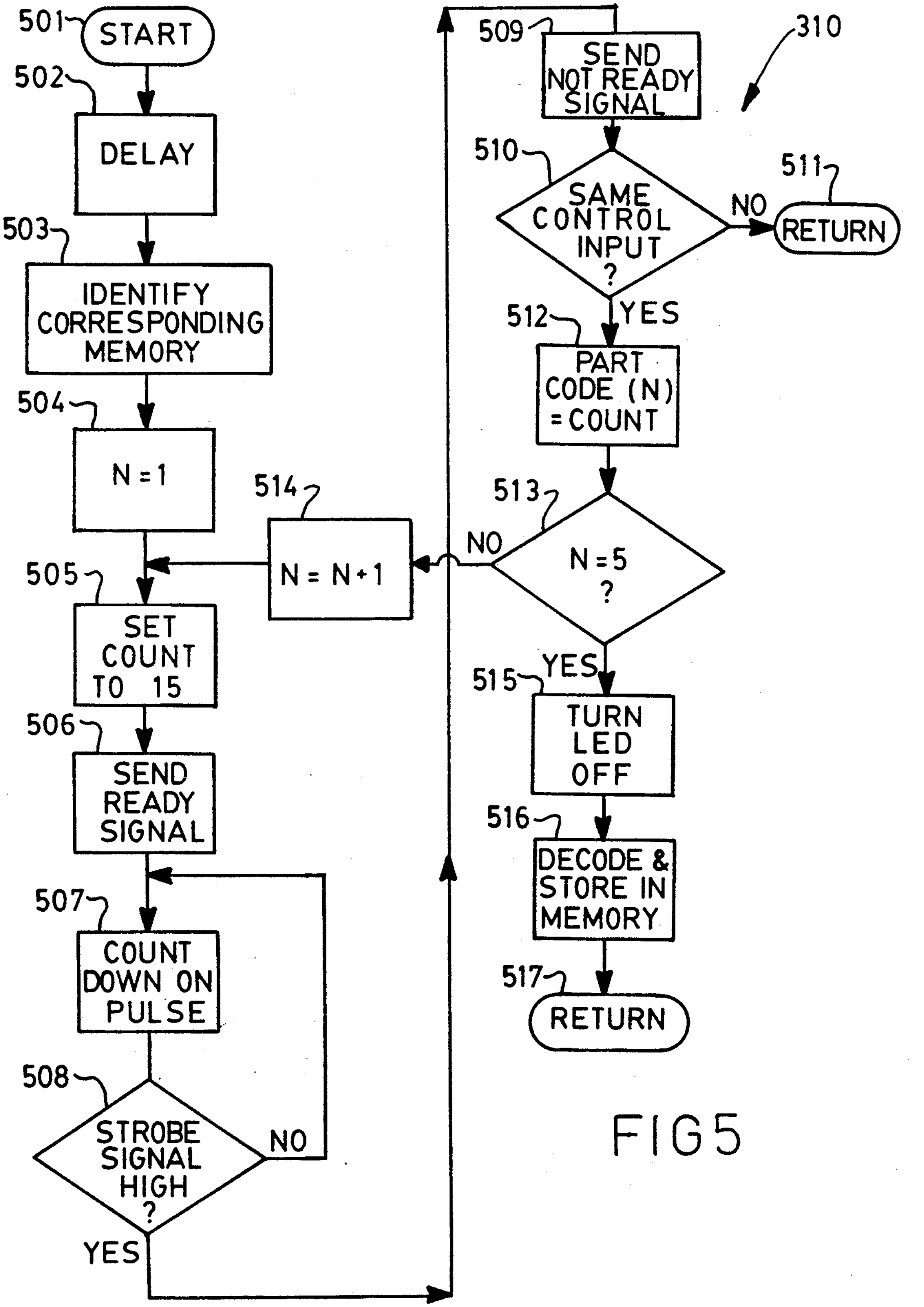
FIG. 5 illustrates a logic sequence chart of the manner in which each of the portable units learns an identification code.
Figure 6:
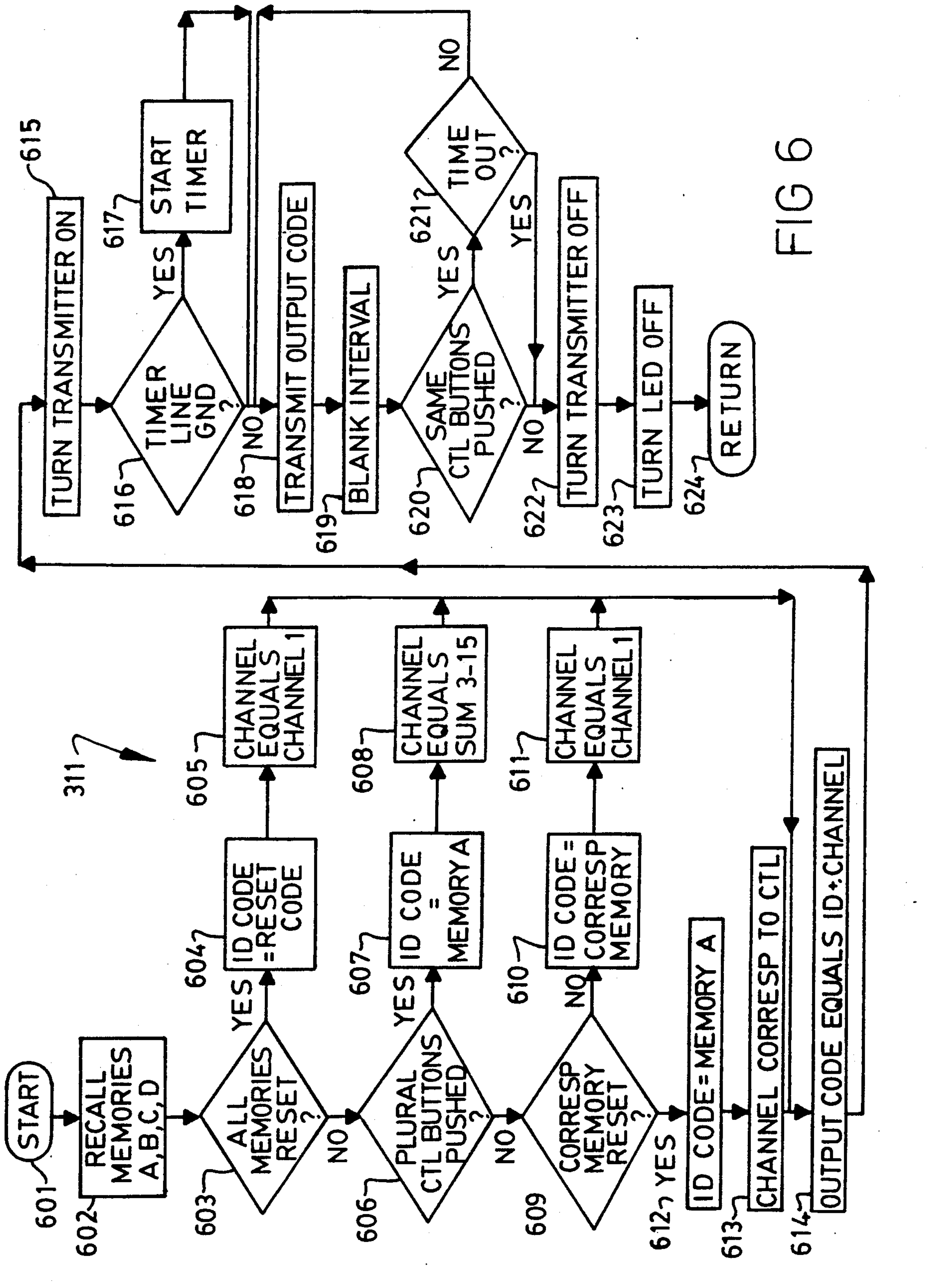
FIG. 6 is a logic sequence chart of the manner in which each of the portable units transmits the data on the radio frequency signal in response to depression of a control button.
Figure 7:
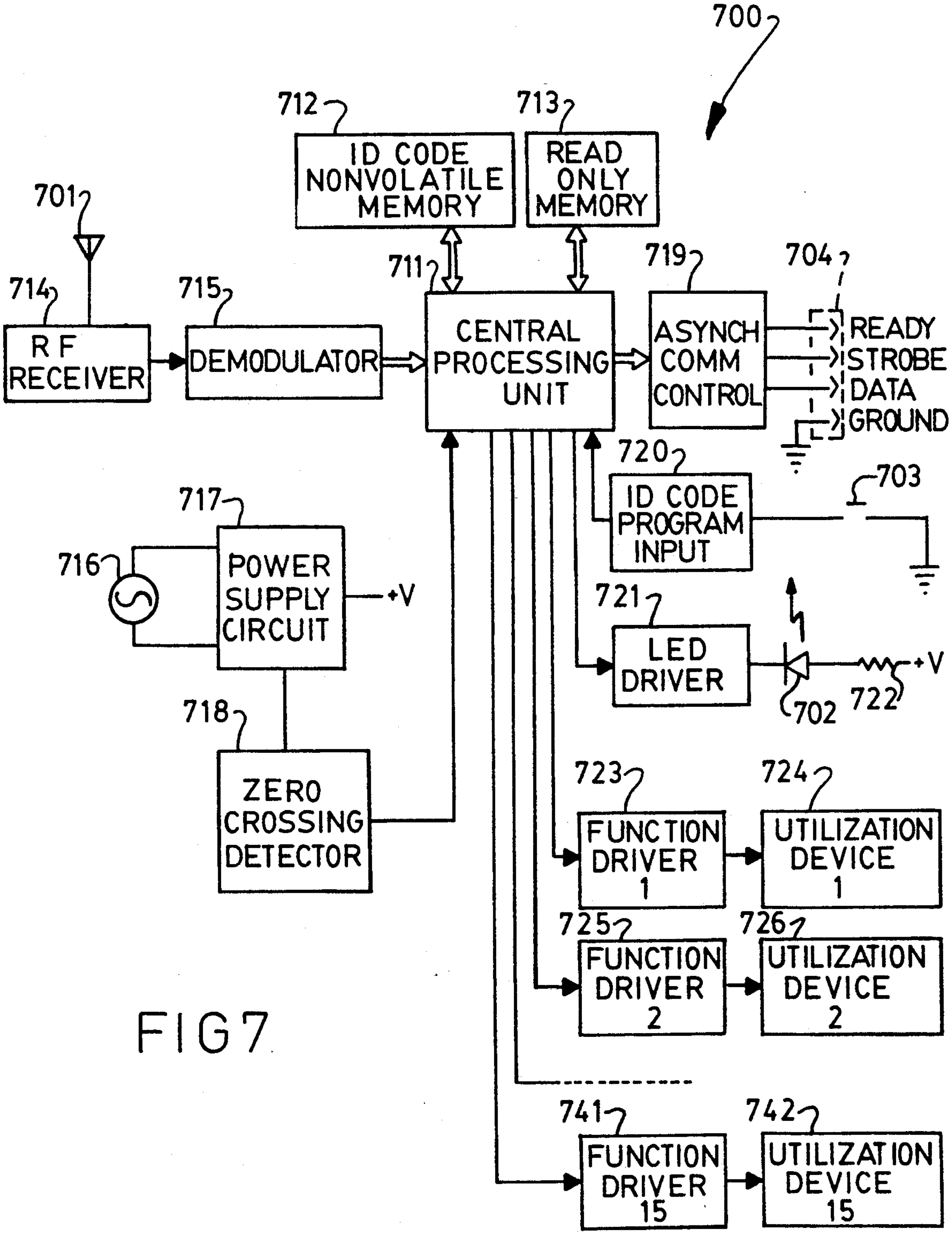
FIG. 7 is a block diagram of the circuits of the base unit in accordance with the preferred embodiment of the present invention.

The following description and figures describe the details of the preferred embodiment of the portable unit 200 and details of the preferred embodiment of the base unit 700. FIG. 2 illustrates in block diagram form the construction of a portable unit 200 in accordance with the preferred embodiment. FIGS. 3 to 6 illustrate logic sequences for control of the operation of central logic unit 211 illustrated in FIG. 2. FIG. 7 illustrates in block diagram form the preferred embodiment of base unit 700. FIGS. 8 to 11 illustrate flow charts of a control program for control of central processing unit 711 illustrated in FIG. 7 for practicing the present invention.

FIG. 2 illustrates in block diagram form the preferred embodiment of portable unit 200. The major electronic portions of portable units 200 are embodied in application specific integrated circuit 210. Various other parts such as momentary push button switches 201 to 204, asynchronous communication port 205, light emitting diode 206, battery 231, capacitor 232, resistors 234 and 237, reset switch 236 and transmitter 240 are coupled to application specific integrated circuit 210. In accordance with the preferred embodiment of the present invention, all of these parts are mounted on a single printed circuit board. Provision of the major portions of portable unit 200 within application specific integrated circuit 210 enables all of these parts to be placed within a generally handheld container. In addition, the power requirements of this portable unit 200 are very modest, enabling battery 231 to be of the low power 9-volt transistor radio type.

Special purpose integrated circuit 210 includes a number of individual parts formed on a single integrated circuit device. The major control and processing functions of application specific integrated circuit 210 are performed by central logic unit 211. Central logic unit 211 is connected to all other circuits of application specific integrated circuit 210 in a manner that is known in the art.

Central logic unit 211 is bi-directionally coupled to identification code volatile memory 212. In accordance with the preferred embodiment of the present invention, identification code volatile memory 212 is capable of storing four multi-bit identification codes which may be employed by portable unit 200 in radio frequency transmissions. Central logic unit 211 can recall identification codes from identification code volatile memory 212 and can store identification codes in identification code memory 212. Identification code volatile memory 212 is preferably formed of static random access memory. Static random access memory is preferred over dynamic random access memory because of its lower power requirements.

Central logic unit 211 is capable of performing predetermined logic functions for control of the operation of portable unit 200. FIGS. 3 to 6 illustrate in flow chart form the logic sequences preferably embodied within central logic unit 211.

Central logic unit 211 is connected to various input and output devices on application specific integrated circuit 210. The first of these is input buffers 213. Input buffers 213 is separately coupled to the momentary contact push button switches 201, 202, 203 and 204. A common connection from one terminal of each of momentary contact push button switches 201, 202, 203 and 204 is connected to the regulated voltage supply $V_{reg}$ from power supply control 214. Thus, depression of any of the momentary contact push button switches 201, 202, 203 or 204 applies the voltage $V_{reg}$ to a corresponding input of input buffers 213. Input buffers 213 preferably includes some form of contact debounce, enabling a clean input signal to be applied to central logic unit 211. Input buffers 213 supply the properly conditioned input signals to central logic unit 211 indicating which one or more of the control buttons 201, 202, 203 or 204 has been depressed. This is the preferred method of setting the control state of portable unit 200. As will be described below, other types of switches could connect the regulated voltage supply $V_{reg}$ to these input terminals of input buffers 213. The essential point is that input buffers 213 is triggered to a particular control state.

Central logic unit 211 is further coupled to power supply control 214. Power supply control 214 is coupled to the positive terminal of battery 231 and generates a regulated voltage supply $V_{reg}$. Power supply control 214 provides proper power conditioning to provide electric power from battery 231 via regulated voltage supply $V_{reg}$. This function of power supply control 214 is known in the art. This voltage $V_{reg}$ is employed to power the circuits of application specific integrated circuit 210. Power supply control 214 is further separately coupled to identification code volatile memory 212 in a manner that will be discussed below. The regulated voltage supply $V_{reg}$ is further separately coupled to switches 201, 202, 203 and 204 and to capacitor 232. This supplies electric power to charge capacitor 232 from battery 231. This serves to store an amount of electric energy within capacitor 232.

As previously described, power supply control 214 is separately coupled to identification code volatile memory 212. The electric power to operate identification code volatile memory 212 is separately supplied to this memory via a separate line from power supply control 214. Under ordinary circumstances when battery 231 is installed, identification code volatile memory 212 is powered via regulated voltage supply $V_{reg}$ like other portions of application specific integrated circuit 210. Power supply control 214 monitors the voltage received from battery 231. In the event that battery 231 is removed from the circuit, such as for replacement of a depleted or nearly depleted battery, power supply control 214 continues to supply continuous electric power to identification code volatile memory 212 via the separate power line from electric energy stored within capacitor 232. Power supply control 214 thus ensures continuous supply of electric power to identification code volatile memory 212 during removal and replacement of battery 231. This serves to preserve the identification codes stores in this memory. Note that it is not necessary to power other portions of volatile memory than the portions storing the identification codes, however, it might be convenient to do so if the total memory power drain is relatively modest. It has been found that a capacitor 232 of relatively modest size can store the required electric energy to power identification code volatile memory 212 for several minutes. This time is believed ample to permit removal and replacement of battery 231.

Application specific integrated circuit 210 includes an optional time out function. This time out function is achieved as follows. At times when the optional time out function may be employed, central logic unit 211 senses the voltage on line 215. As illustrated in dashed lines in FIG. 2, line 215 is optionally connected at terminal 233 to either the voltage supply $V_{reg}$ or to ground. If the voltage on line 215 is $V_{reg}$, then no time out function is implemented. If the voltage on line 215 is ground, then the optional time out function is implemented. Central logic unit 211 counts pulses from clock 219 in a counter. When the count reaches a number predetermined in manufacture of application specific integrated circuit 211, then the time out occurs. Thus the same application specific integrated circuit 211 can optionally provide this time out function depending upon the connection to line 215.

Transmit power switch 216 controls the supply of electric power to radio frequency transmitter 240. Transmit power switch 216 is controlled by central logic unit 211. Radio frequency transmitter 240 is powered directly from battery 231 via the voltage $V_{dd}$. Transmit power switch 216 is further coupled to transmitter 240 for optional connection to ground. During standby operation of portable units 200, central logic unit 211 controls transmit power switch 216 to disconnect radio frequency transmitter 240 from ground. Therefore, transmitter 240 consumes no electric power under these circumstances. When a radio frequency transmission is desired, central logic unit 211 controls transmit power switch 216 to connect radio frequency transmitter 240 to ground enabling the supply of electric power to radio frequency transmitter 240. Central logic unit 211 is further coupled to a data input of radio frequency transmitter 240 for control of the modulation of the radio frequency signal transmitted by radio frequency transmitter 240. This modulation will be further described below.

Central logic unit 211 is bi-directionally coupled to asynchronous communication controller 218 which is further coupled to asynchronous communication port 205. FIG. 2 illustrates asynchronous communication port 205 including four lines: ready; strobe; data; and ground. In a manner known in the prior art, central logic unit 211 communicates with asynchronous communication controller 218 for receipt of data from asynchronous communication port 205. The communications protocol employed in the preferred embodiment will be fully described below.

Central logic unit 211 has its operations timed by clock 219. The particular clock rate of clock 219 is controlled by resistor 234 and capacitor 235 coupled to clock 219. Note that clock 219 is controlled by central logic unit 211. Central logic unit 211 enables clock 219 only when an input is received via input buffers 213 or asynchronous communication controller 218. This serves to reduce the electric power consumed by application specific integrated circuit 210 and extend the life of battery 231 by idling this circuit when no processing is required.

Central logic unit 211 is coupled to reset input buffer 220 which is in turn coupled to reset momentary contact push button switch 236. Upon depression of reset momentary contact push button switch 236, the input of reset input buffer 220 is connected to ground. Upon detection of this event, reset input buffer 220 signals this to central logic unit 211 which takes action in accordance with the logic sequences disclosed below.

Central logic unit 211 is coupled to light emitting diode driver 221. Light emitting diode driver 221 is coupled to drive light emitting diode 206. Resistor 237 is included in series with light emitting diode 206 to limit the current supplied through light emitting diode 206. Central logic unit 211 provides a signal to light emitting diode driver 221 which sinks current to turn light emitting diode 206 on for signaling purposes. The time at which such signaling will occur will be fully described below in conjunction with FIGS. 3, 4, 5 and 6.

The operation of portable unit 200 will now be described in conjunction with logic sequence charts illustrated in FIGS. 3, 4, 5 and 6. These logic sequence charts illustrate the sequence of logic within central logic unit 211. These logic sequence charts are not intended to illustrate the exact details of operation of central logic unit 211. Rather, these logic sequence charts illustrate the general overall steps necessary for control of central logic unit 211. Those skilled in the art of control logic design would be able to construct central logic unit 211 in accordance with this description to embody the present invention. Note that it is feasible to construct central logic unit 211 as the central processing unit in a microprocessor device. Those skilled in the art of microprocessor programing would be able to provide the exact program for control of such a central processing unit from these logic sequence charts, once the particular central processing unit is selected with its corresponding instruction set.

The following discussion will refer to operations performed by central logic unit 211. In some instances these operations will be more properly understood as performed by other portions of application specific integrated circuit 210. However, these operations will be under the supervision and control of central logic unit 211 and therefore the logic sequence of central logic unit 211 will generally be in accordance with these logic sequence charts.

Figure 3:
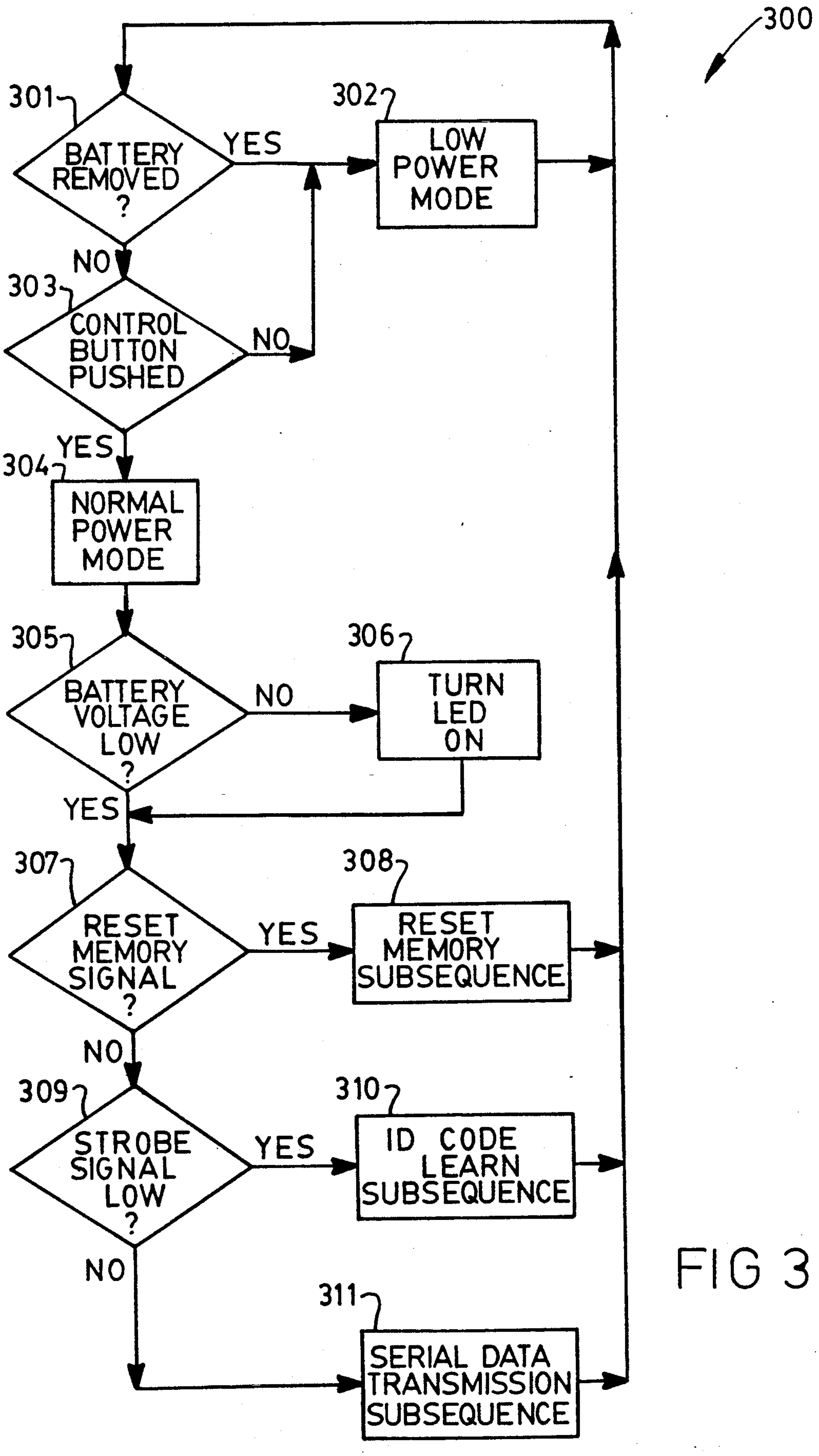
FIG. 3 is a logic sequence chart illustrating the basic operation of each of the portable units.
Figure 4:
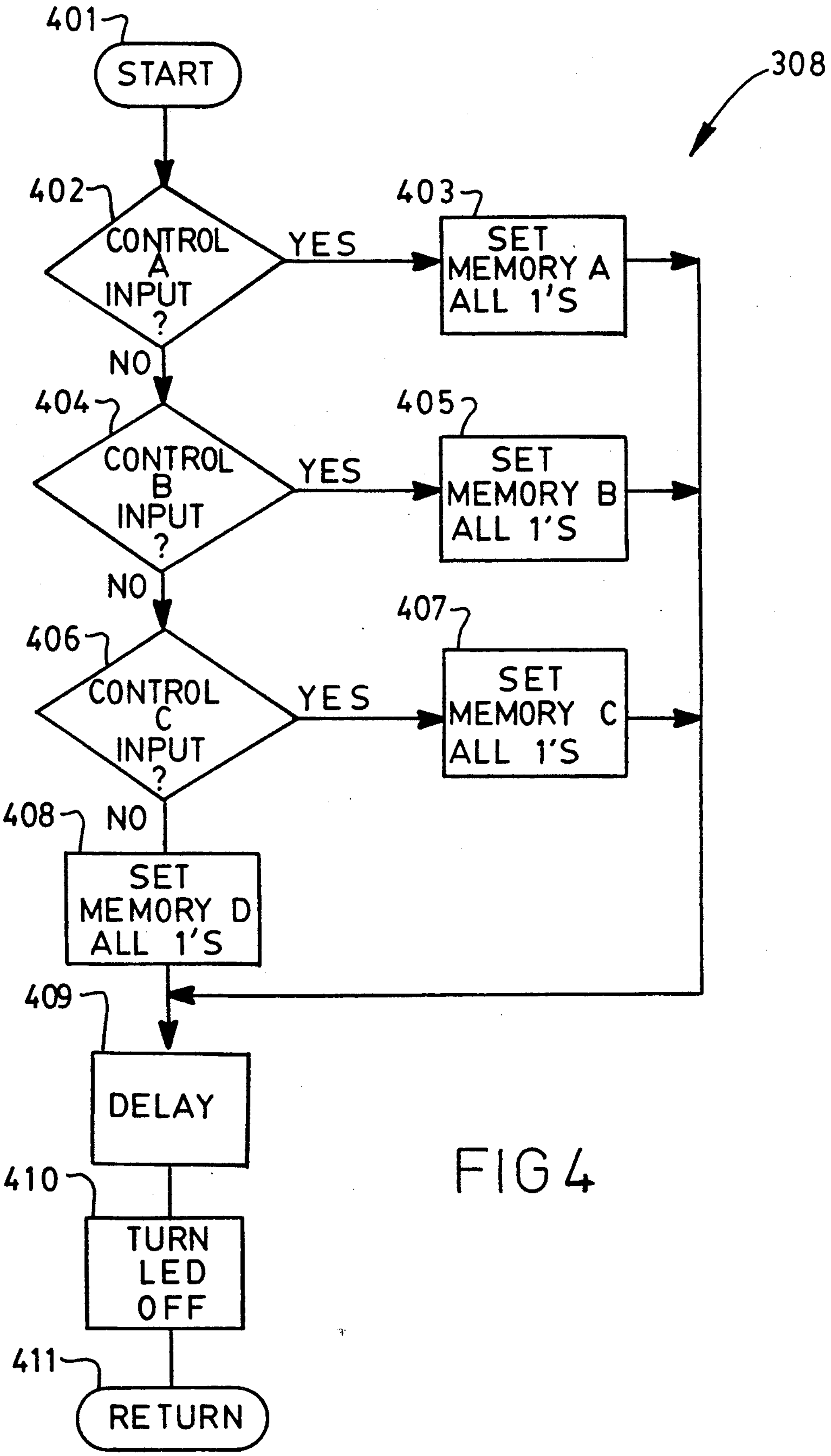
FIG. 4 is a logic sequence chart illustrating the manner of resetting the identification code memories of each of the portable units to a factory preset code.

FIG. 3 illustrates logic sequence 300 for control of the operation of central logic unit 211. In accordance with the preferred embodiment of the present invention, this logic sequence, together with the logic subsequences referred to herein and illustrated in FIGS. 4, 5 and 6 are permanently embodied in central logic unit 211. This logic sequence is executed in accordance with the principles known in the art.

Logic sequence 300 includes a continuously executed set of tests to determine the operation to be performed next. Logic sequence 300 first tests to determine whether the battery 231 is present (decision block 301). This information is obtained from power supply control 214 which detects an open circuit condition at the power input line. In the event that battery 231 has been removed then central logic unit 211 causes application specific integrated circuit 210 to enter a low power mode (processing block 302). This is achieved by controlling clock 219 to shut down, thereby reducing the electric power consumed by application specific integrated circuit 211. Identification code volatile memory 212 is powered via the separate power line from power supply control 214 from energy stored in capacitor 232. No normal functions of application specific integrated circuit 210 are permitted while battery 231 is removed.

If the battery 231 is connected to the circuit then logic sequence 300 tests whether or not one or more of control buttons 201, 202, 203 or 204 have been depressed (decision block 303). This information is obtained from input buffers 213 which continuously monitors the state of the control buttons 201, 202, 203 and 204. In the event no control button is depressed then central logic unit 211 causes application specific integrated circuit 210 to enter the low power mode (processing block 302) as described above. These tests are continuously repeated until one or more of the control buttons 201, 202, 203 and 204 is depressed.

In the event that one or more of control buttons 201, 202, 203 or 204 have been depressed (decision block 303), then central logic unit 211 causes application specific integrated circuit 210 to enter the normal power mode (processing block 304). This is achieved by controlling clock 219 to operate, thereby allowing normal operation of application specific integrated circuit 211 powered from battery 231.

In the event that one or more of the control buttons 201, 202, 203 or 204 have been depressed and application specific integrated circuit 210 is operating in the normal power mode, logic sequence 300 tests to determine whether the voltage from battery 231 is low (decision block 305). This low voltage determination is made by power supply controller 214 and signaled to central logic unit 211. In the event that the battery voltage is not below a certain threshold then the light emitting diode 206 is turned on (processing block 306). This is achieved by sending the proper control signal to light emitting diode driver 221.

Regardless of the status of the battery voltage, logic sequence 300 next tests to determine whether or not the reset signal is received from reset input buffer 220 (decision block 307). This indicates that reset push button 236 was depressed at the time of depression of one of the control button 201, 202, 203, 204. If such a reset memory signal has been received then logic sequence 300 executes a reset memory logic subsequence (processing block 308). This reset memory logic subsequence 308 is further described below in conjunction with FIG. 4. Upon execution of this logic subsequence control returns to decision block 301 to repeat the continuous tests for battery removal (decision block 301) and depression of the control buttons 201, 202, 203 and 204 (decision block 303).

In the event that the reset memory signal is not received, then logic sequence 300 tests to determine whether or not a digital low signal is applied to the strobe input of asynchronous communication port 205 (decision block 309). Asynchronous communication controller 218 monitors the strobe line of asynchronous communication port 205 and signals central logic unit 211 when a low signal is received at this line. In the event that asynchronous communication controller 218 indicates a low signal on the strobe input, logic sequence 300 executes an identification code learn logic subsequence (processing block 310). This identification code learn logic subsequence 310 is more fully described below in conjunction with FIG. 5. Upon completion of this logic subsequence control returns to decision block 301 to repeat the continuous test for removal of battery 231 (decision block 301) and depression of the control buttons 201, 202, 203 and 204 (decision block 303).

In the event that neither the memory reset signal nor the strobe low signal are received, then logic sequence 300 enters the serial data transmission logic subsequence (processing block 311). This involves control of radio frequency transmitter 240 to transmit a radio frequency signal to base unit 700. The serial data transmission logic subsequence 311 is further described below in conjunction with FIG. 6. Upon completion of this logic subsequence control returns to decision block 301 to repeat the continuous test for removal of battery 231 (decision block 301) and depression of the control buttons 201, 202, 203 and 204 (decision block 303).

FIG. 4 illustrates reset memory logic subsequence 308 described above in conjunction with FIG. 3. Reset memory logic subsequence 308 enables the particular identification code stored within identification code vault memory 212 corresponding to one of the control buttons 201, 202, 203 or 204 to be reset to a factory preset code. In accordance with the preferred embodiment of the present invention, this factory preset code is all ones. This factory preset code is called the reset code. Reset memory logic subsequence 308 is begun by a start block 401. Reset memory logic subsequence 308 tests to determine whether or not the control A input is received (decision block 402). Input buffers 213 generates a control A input upon depression of control button 201. If this signal is received then the identification code memory corresponding to the control A input is set to this reset code (processing block 403). If the control A input has not been received then reset memory logic subsequence 308 tests to determine whether or not the control B input has been received (decision block 404). If this is the case then the memory corresponding to the control B input is set to the reset code (processing block 405). In the event that the control B input has not been received then reset memory logic subsequence 308 tests to determine whether or not the control C input has been received (decision block 406). If the control C input was received then the identification code corresponding to this control input is reset (processing block 407). In the event that the control C input has not been received then the control D input must have been received. Note that decision block 303 of FIG. 3 has previously determined that at least one control button has been depressed. In this event the memory corresponding to control D signal is reset (processing block 408).

Regardless of the particular control input received, reset memory logic subsequence 308 executes a short delay time (processing block 409). Next reset input logic subsequence 308 turns off light emitting diode 206 (processing block 410). This is achieved by sending the proper control signal to light emitting diode driver 221. Reset memory logic subsequence 308 is then exited by a return block 411, returning control to main logic sequence 300. Thus, the user is enabled to reset any of the identification code memories corresponding to control buttons 201, 202, 203 or 204 by simultaneously depressing the particular control button and the reset button 236. Light emitting diode 206 is illuminated at the start of this process and then turned off after reset of the particular memory, thereby signaling to the user the completion of this reset operation.

FIG. 5 illustrates in logic sequence chart form the identification code learn logic subsequence 310. As explained above in relation to FIG. 3, identification code learn logic subsequence 310 is entered whenever a control button is pressed and asynchronous communications controller 218 detects a digital low signal at the strobe line of the asynchronous communication port 205. Identification code learn logic subsequence 310 is entered via start block 501. Identification code learn logic subsequence 310 first executes a delay (processing block 502). This delay serves to ensure that the portable unit 200 and the base unit 700 have each reached the proper state prior to transmission of the identification code data. Next, identification code learn logic subsequence 310 identifies the corresponding memory location within identification code volatile memory 212 which corresponds to the particular control button depressed (decision block 503). Next, identification code learn logic subsequence 310 sets a counting variable N equal to 1 (processing block 504). This counting variable N is employed to indicate when transfer of the entire identification code is complete. In accordance with the preferred embodiment of the present invention, a 20-bit identification code is transmitted as five four bit nibbles.

Next, a count is set to 15 (processing block 505) and central logic unit 211 instructs asynchronous communication controller 218 to generate a ready signal (processing block 506). Asynchronous communications controller 218 provides a signal on the ready line of asynchronous communications port 205 indicating portable unit 200 is ready to receive data corresponding to an identification code.

Identification code learn logic subsequence 310 then enters a counting loop for one nibble of the identification code. The count (previously set to 15 in processing block 505) is decremented on the detection of a pulse on the data line of asynchronous communications port 205 (processing block 507).

Identification code learn logic subsequence 310 next tests to determine whether or not the strobe signal on strobe line of asynchronous communications port 205 is a digital high (decision block 508). If this strobe signal is still a digital low then identification code learn logic subsequence 310 returns to processing block 507 to count further pulses. If, on the other hand, the signal on the strobe line of asynchronous communication port 205 is a digital high, the transmission of a particular nibble of the identification code is complete as signaled by the base unit 700. At this point, asynchronous communications controller 218 sends a not ready signal via the ready line of asynchronous communications port 205 (processing block 509). This indicates to base unit 700 that the portable unit 200 is processing the last received data and is not in a state where it can receive additional data. Identification code learn logic subsequence 310 next tests to determine whether the same control input is received (decision block 510). This is determined by the signal provided by input buffers 213 to central logic unit 211. If the same control input is not received then the identification code learn logic subsequence 308 is aborted via return block 511, which returns control to logic sequence 300 illustrated in FIG. 3. This ensures that the same control button 201, 202, 203 or 204 is depressed during the entire identification code learning process, ensuring that the user intended the storage of the identification code received from the base unit 700 in the corresponding portion of identification code volatile memory 212. If the same control input is received, then identification code learn logic subsequence 310 sets a portion of the code corresponding to the counting variable N equal to the resulting count (processing block 512). The identification code learn logic subsequence 310 then tests to determine whether the counting variable N equals five (decision block 513). If the counting variable does not equal five then all of the identification code has not been transmitted to the portable unit. In this event, the counting variable N is incremented (processing block 514) and control returns to processing block 505 to repeat the process of receiving the next nibble of data.

In the event that the five nibbles of data have been received, that is, the counting variable N equals five (decision block 513), then identification code learn logic subsequence 310 turns the light emitting diode 206 off (processing block 515) indicating to the user that the data transfer process is complete. Next, identification code learn logic subsequence 310 decodes the five partial codes and stores the thus identified identification code in the appropriate memory (processing block 516). In this regard, each nibble of data corresponds to the four bit binary representation of the count during the transmission of that particular nibble of data. The resultant identification code is the concatenation of these five nibbles of data. Once this decoding and storing is complete identification code learn logic subsequence 310 is exited via return block 517.

FIG. 6 illustrates in logic sequence chart form serial data transmission logic subsequence 311. Serial data transmission logic subsequence 311 causes the transmission of a radio frequency signal modulated by a particular code for control of base unit 700. Serial data transmission logic subsequence 311 is begun via start block 601. This logic subsequence first recalls the data stored in the corresponding memories A, B, C and D (processing block 602) which correspond to the respective control buttons 201, 202, 203 and 204. Serial data transmission logic subsequence 311 then tests to determine whether all of these memories are reset (decision block 603). Recall that the reset identification code is the factory preset identification code. In accordance with the preferred embodiment, this reset code is all ones. If all the memories are reset, then the serial data transmission logic subsequence 311 sets the identification code equal to this reset code (processing block 604) and sets a channel number equal to channel 1 (processing block 605).

In the event that the memories are not all reset, serial data transmission logic subsequence 311 tests to determine whether or not a plurality of control buttons 201, 202, 203 and 204 have been pushed (decision block 606). In the event that a plurality of the control buttons have been pushed then serial data transmission logic subsequence 311 sets the identification code equal to the identification code stored within memory A (processing block 607). The channel is set equal to a number from three to fifteen corresponding to the particular control buttons pressed (processing block 608). In this regard, depression of control button 201 corresponds to a digital "0001", depression of control button 202 corresponds to a digital "0010", depression of control button 203 corresponds to a digital "0100" and depression of control button 204 corresponds to a digital "1000." The particular channel number equals the sum of the digital numbers for the particular control buttons depressed.

In the event that only a single control button is depressed serial data transmission logic subsequence 311 tests to determine whether or not the identification code memory corresponding to this single control button depressed is reset (decision block 609). If this is not the case then the identification code equals the identification code stored in the memory corresponding to the particular control button 201, 202, 203 or 204 depressed (processing block 610) and the channel number is set equal to channel 1 (processing block 611). In the event that the corresponding memory of the single control button pushed is reset then the identification code is set equal to the identification code stored in memory A (processing block 612) and the channel is set corresponding to the particular control button depressed in accordance with the above digital identification (processing block 613).

Regardless of the manner in which the identification code and the channel are set the output produced by transmitter 240 corresponds to a concatenation of this identification code and the channel number (processing block 614).

Serial data transmission logic subsequence 311 next turns on radio frequency transmitter 240 (processing block 615). This is achieved by central logic unit 211 sending the appropriate signal to transmit power switch 216 to connect radio frequency transmitter 240 to ground, thereby permitting supply of electric power.

Next, the central logic unit detects whether or not the voltage at the timer line 215 is ground (decision block 616). Recall that the optional connection to this timer line 215 determines whether a time out function is implemented. If this is connected to ground then the internal counter is started (processing block 617). As described above, a counter counts clock pulses from clock 219 until a predetermined number is reached indicating the time out. In accordance with the preferred embodiment of the present invention the predetermined number is preset in construction relative to the rate of clock 219 to achieve a time of approximately 1.5 seconds. This nominal time of 1.5 seconds is selected to achieve a worst case time of no more than 2 seconds. If this line is not connected to ground, then the timer is not started and no time out can occur.

Serial data transmission logic subsequence 311 next transmits the output code (processing block 618) via a signal from central logic unit 211 turning on and off the modulation of radio frequency transmitter 240. In accordance with the preferred embodiment of the present invention the ones and zeros of the digital output code transmitted are transmitted in pulse code format. A particular bit period is set equal to four subperiods. The transmission of a digital one is the transmission for three subperiods and nontransmission for the last subperiod. Transmission of a digital zero is transmission for the first subperiod and nontransmission for the second, third and fourth subperiods. Those skilled in the art would clearly understand that other modulation techniques are available for transmission of digital data via radio frequency signals. Radio frequency transmitter 240 transmits the thus modulated radio frequency signal via antenna 241.

Next, serial data transmission logic subsequence 311 enters a blank interval (processing block 619) during which no modulated transmissions are made. This blank interval is preferably as long as or slightly longer than the time needed to transmit the identification code and channel number. Serial data transmission logic subsequence 311 next tests to determine whether the same control buttons are depressed (decision block 620). In the event that the same control buttons are depressed, then serial data transmission logic subsequence 311 tests to determine whether or not a time out has occurred (decision block 621). Note that such a time out is optional and if timer line 215 is connected to the regulated voltage supply $V_{reg}$ no time out will ever occur. If no time out has occurred then control returns to processing block 618 to repeat the transmission of the output code and the blank interval. Thus, if the same control buttons are depressed transmission of the output code followed by the blank interval is repeated until the a time out occurs (if such a time out function is selected). If the time out function is not selected, transmission continues until the control button or buttons are released.

In the event that either the same control buttons are not pressed or a time out has occurred then the transmitter is turned off (processing block 622). This is achieved via control of transmit power switch 216. Next, serial data transmission logic subsequence 311 turns off light emitting diode 206 (processing block 623). This indicates to the user that the serial data transmission process is complete. Lastly, serial data transmission logic subsequence 311 is exited via return block 624.

FIG. 7 illustrates in block diagram form the Preferred embodiment of base unit 700. Base unit 700 illustrated in FIG. 7 includes elements already illustrated in FIG. 1: antenna 701; light emitting diode 702; reset/identification code selection push-button 703; and asynchronous communication port 704. In the preferred embodiment base unit 700 is constructed in the form of a microprocessor control system. Major control and operating functions of base unit 700 are controlled by central processing unit 711. Central processing unit 711 is coupled to an identification code nonvolatile memory 712. The identification code of the base unit is stored within identification code nonvolatile memory 712. In the preferred embodiment, identification code nonvolatile memory 712 consists of electrically erasable programmable read only memory (EEPROM). The programming of this identification code nonvolatile memory 712 will be further discussed below. It is technically feasible, and may be desirable in some instances, to construct base unit 700 without the capability of altering its identification code. This may be useful in the primary level of a multilevel security system. In this event identification code nonvolatile memory 712 would be embodied by read only memory. Central processing unit 711 is further bi-directionally coupled to read only memory 713 which stores the control program for central processing unit 711.

Radio frequency signals received from one of portable units 200 are received via antenna 701 and coupled to radio frequency receiver 714. The received signals are then coupled to demodulator 715 which produces an identification code corresponding to the identification code modulated on the received radio frequency signal in accordance with the particular modulation technique employed. This identification code is supplied to central processing unit 711.

Electric power for operation of base unit 700 preferably comes from 60 Hertz AC electric power mains 716. Power supply circuit 717 is coupled to power supply mains 716 and produces power on one or more power supply buses +V. Also coupled to power supply circuit 717 is a zero crossing detector circuit 718 which is responsive to the zero crossings of the 60 Hertz AC power received from electric power mains 716. Zero crossing detector circuit 718 transmits a signal to central processing unit 711 upon detection of each zero crossing of the 60 Hertz AC electric power mains 716.

Central processing unit 711 is coupled to asynchronous communication controller circuit 719 which is turn connected to a asynchronous communication port 704. Asynchronous communication port 704 is illustrated as including the following lines: ready; strobe; data; and ground. These correspond to the connections illustrated in FIG. 2 of asynchronous communication port 205. Asynchronous communication ports 205 and 704 are constructed to mate for transmission of data thereacross. Asynchronous communication controller 719 is constructed in accordance with the prior art.

Central processing unit 711 is coupled to identification code program input 720. Identification program input 720 is further coupled to reset/identification code selection button 703. Upon depression of button 703, identification code program input 720 transmits a signal to central processing unit 711.

Central processing unit 711 is further connected to light emitting diode driver 721. Light emitting diode driver 721 sinks an appropriate current from the series connection of light emitting diode 702 and resistor 722 for illumination of light emitting diode 702 in accordance with commands received from central processing unit 711.

Base unit 700 further includes a plurality of function driver circuits 723, 725 to 741 which are coupled to respective utilization devices 724, 726 to 742. The function driver circuits 723 to 741 provide the appropriate signal to respective utilization devices 724 to 742 for remote control operation in accordance with signals received from central processing unit 711. This operation will be further detailed below in conjunction with the operation of base unit 700.

FIGS. 8, 9, 10 and 11 together illustrate the control program for control of central processing unit 711 of base unit 700. This control program is permanently stored in read only memory 713 upon construction of base unit 700. These flow charts are not intended to illustrate the exact detailed steps for control of central processing unit 711. Rather, these flow charts illustrate the general overall steps necessary for operation of central processing unit 711 in accordance with the present invention. Those skilled in the art of microprocessor programming would be enabled to provide the exact program necessary for practicing the present invention from these flow charts, once the particular microprocessor to embody central processing unit 711 is selected with its corresponding instruction set.

Figure 8:
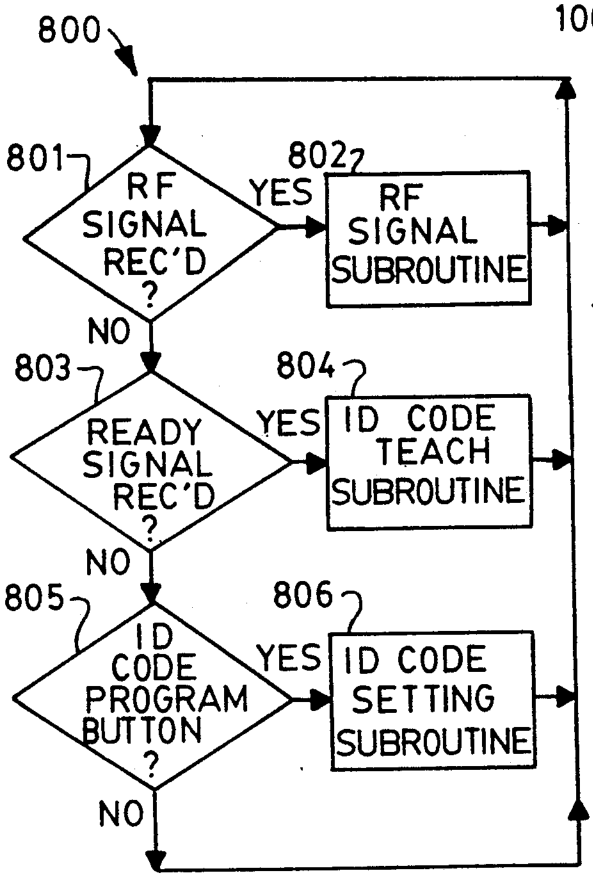
FIG. 8 is a flow chart illustrating the basic operation of the base unit.

FIG. 8 illustrates control program 800 for control of the operation of base unit 700. Control program 800 is a continuous test loop which tests for certain events and performs subroutines based upon these events. Program 800 tests to determine whether or not a radio frequency signal has been received (decision block 801). As noted above, any radio frequency signal transmitted by a portable unit 200 is received via antenna 701 and radio frequency receiver 714. Demodulator 715 demodulates any identification code modulated on such a radio frequency transmission and supplied this identification code to central processing unit 711. Thus central processing unit 711 is alerted to the receipt of such an radio frequency signal by receipt of the demodulated identification code from demodulator 715. If such a radio frequency signal has been received then program 800 executes radio frequency signal subroutine 802.

In the event that such a radio frequency signal has not been received, program 800 tests to determine whether or not the ready signal has been received on asynchronous communication port 704. If this is the case then the identification code teach subroutine is executed (processing block 804).

If such a ready signal has not been received, then program 800 tests to determine whether or not the identification code program button 703 has been depressed (decision block 805). If this identification code program button has been depressed then program 800 executes an identification code setting subroutine (processing block 806). In the event that none of these signals are received program 800 returns to decision block 801 to repeat the set of tests.

Figure 9:
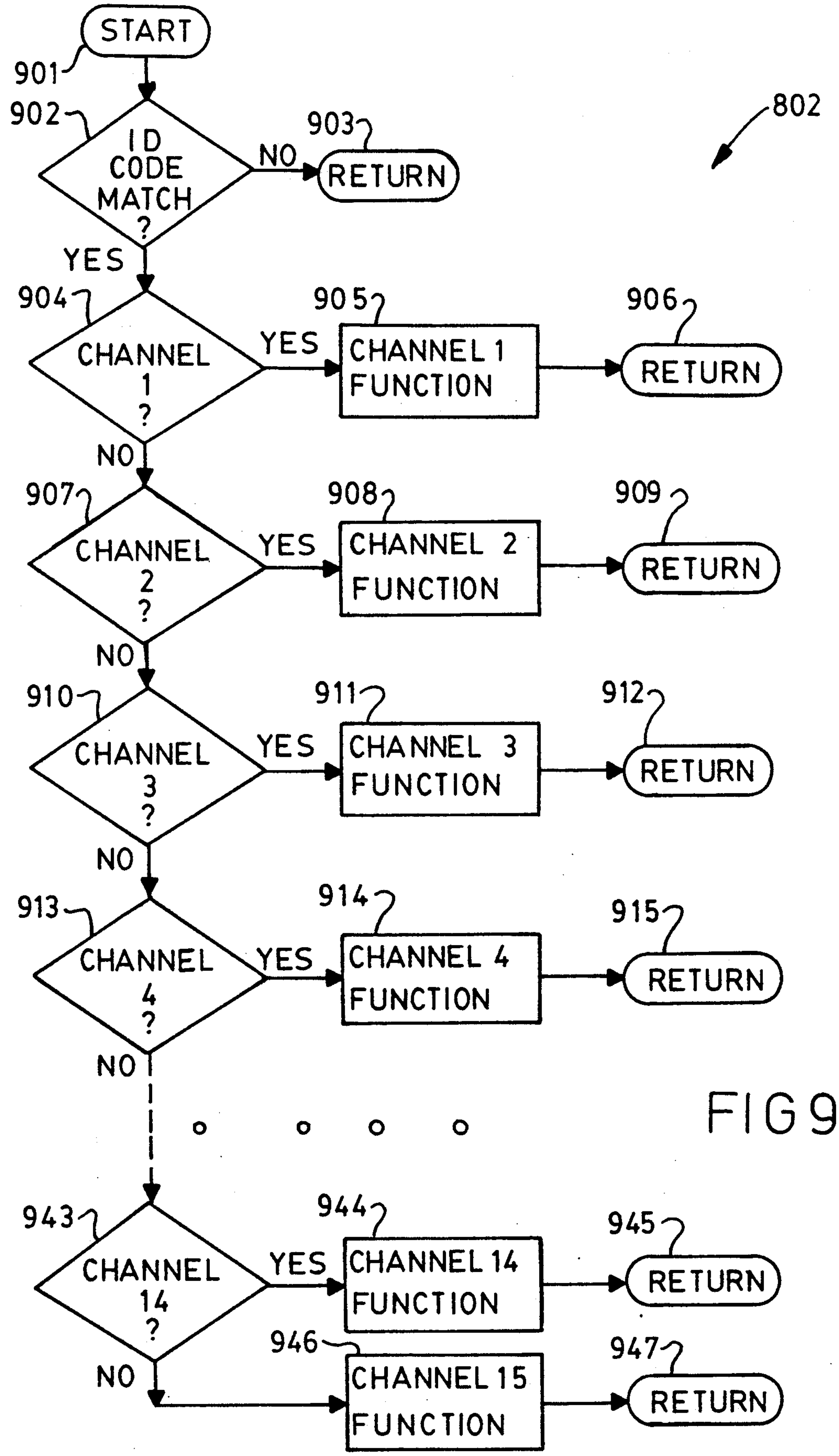
FIG. 9 is a flow chart illustrating control of the operation of the base unit in response to receipt of a radio frequency signal from a portable unit.

FIG. 9 illustrates radio frequency signal subroutine 802. Radio frequency signal subroutine 802 is begun via start block 901. This subroutine first tests to determine whether or not the identification code modulated on the received radio frequency signal demodulated by demodulator 715 matches the base unit identification code stored in identification code nonvolatile memory 712 (decision block 902). If this is not the case then base unit 700 takes no action and radio frequency signal subroutine 802 is exited via return block 903. This returns control to the test loop illustrated in FIG. 8.

In the event that the received radio frequency signal has an identification code matching the identification code on the base unit, radio frequency signal subroutine 802 performs differing actions depending upon the channel number of the received radio frequency signal. Radio frequency signal subroutine 802 tests to determine whether or not the received signal includes channel number 1 (decision block 904). In the event that the received signal indicates channel number 1, radio frequency signal subroutine 802 activates the channel 1 function (processing block 905). This is achieved by central processing unit 711 sending the appropriate signal to function driver 723. Function driver 723 in turn supplies a corresponding signal to the first utilization device 724. Radio frequency signal subroutine 802 is then exited via return block 906, returning control to the test loop illustrated in FIG. 8.

In the event that the channel number is not channel 1, radio frequency signal subroutine 802 tests to determine whether or not the received signal includes channel number 2 (decision block 907). If the received signal indicates channel number 2, radio frequency signal subroutine 802 activates the channel 2 function (processing block 908) by central processing unit 711 sending the appropriate signal to function driver 725. Function driver 725 in turn supplies a corresponding signal to second utilization device 726. Radio frequency signal subroutine 802 is then exited via return block 909, returning control to the test loop illustrated in FIG. 8.

Radio frequency signal subroutine 802 then tests in order whether the channel number was channel number 3 (decision block 910), channel number 4 (decision block 913) and so on through channel number 14 (decision block 943). If the received channel number was channel number 3, then radio frequency signal subroutine 802 activates the channel 3 function (processing block 911) and then exits to the test loop illustrated in FIG. 8 (return block 912). Likewise, if channel number 4 was received, then radio frequency signal subroutine 802 activates the channel 4 function (processing block 914) and then exits to the test loop illustrated in FIG. 8 (return block 915). Similar functions are performed for channel numbers 5 to 13. If channel number 14 is received (decision bloc 943) then the channel number 14 function is executed (processing block 944) and subroutine 802 is exited via return block 945. In the event that the channel number 14 is not indicated then the channel number must have been channel number 15. In this event the channel number 15 function is executed (processing block 946) and then radio frequency signal subroutine 802 is exited via return block 947.

Figure 10:
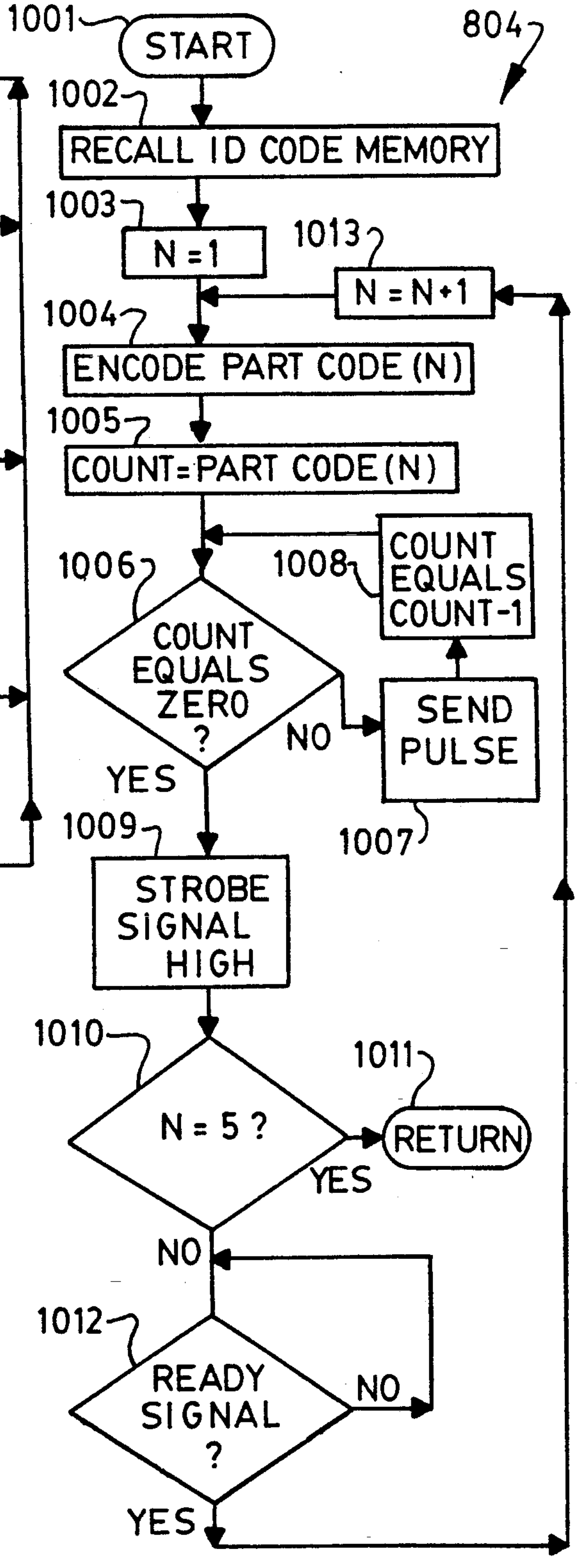
FIG. 10 is a flow chart illustrating the manner in which the base unit teaches an identification code to a portable unit.

FIG. 10 illustrates in flow chart form the identification code teach subroutine 804. Identification code teach subroutine 804 is entered via start block 1001. Identification code teach subroutine 804 first recalls the identification code from identification code nonvolatile memory 712 (processing block 1002). The subroutine next sets a counting variable N equal to 1 (processing block 1003). Next the appropriate nibble of data corresponding to the counting variable N is encoded (processing block 1004). A count is set equal to the binary number corresponding to this particular nibble of data (processing block 1005).

Identification code teach subroutine 804 next enters a loop to transfer the present nibble of the identification code. Identification code teach subroutine 804 tests the count to determine whether or not it equals 0 (decision block 1006). If the count does not equal 0 then the proper number of counts have not been transmitted to the portable unit 200. In such an event, identification code teach subroutine 804 sends a pulse (processing block 1007), the count is decremented (processing block 1008) and control returns to processing block 1006. Identification code teach subroutine 804 remains in this loop until the count has been decremented to 0. This loop causes transmission of pulses equal to the number represented by the nibble being transmitted. Note the structure of the loop putting the test for zero (decision block 1006) prior to transmitting the pulse (processing block 1007) permits the identification code teach subroutine 804 to transmit zero pulses corresponding to a nibble of "0000."

Once a complete nibble has been transmitted identification code teach subroutine 804 sets the strobe signal to a digital high (processing block 1009). This signals to the portable unit 200 that the complete nibble has been transmitted. The subroutine next tests to determine whether or not the counting variable N equals 5 (decision block 1010). If this is the case then the entire identification code has been transmitted to the portable unit 200 and the identification code teach subroutine 804 is exited via return block 1011. In the event that the counting variable N does not equal 5, then the entire identification code has not been transmitted to the portable unit 200. In such an event identification code teach subroutine 804 tests to determine whether or not a ready signal is received from the portable unit 200 (decision block 1012). The identification code teach subroutine 804 continues to test for the receipt of this ready signal, indicating that the portable unit 200 is ready for receipt of the next nibble of data. Once this occurs then the counting variable N is incremented (processing block 1013) and control returns to processing block 1004 to transmit the next nibble of data. Identification code teach subroutine 804 remains in this loop transmitting the nibbles of data until the entire identification code has been transmitted to the portable unit 200.

Figure 11:
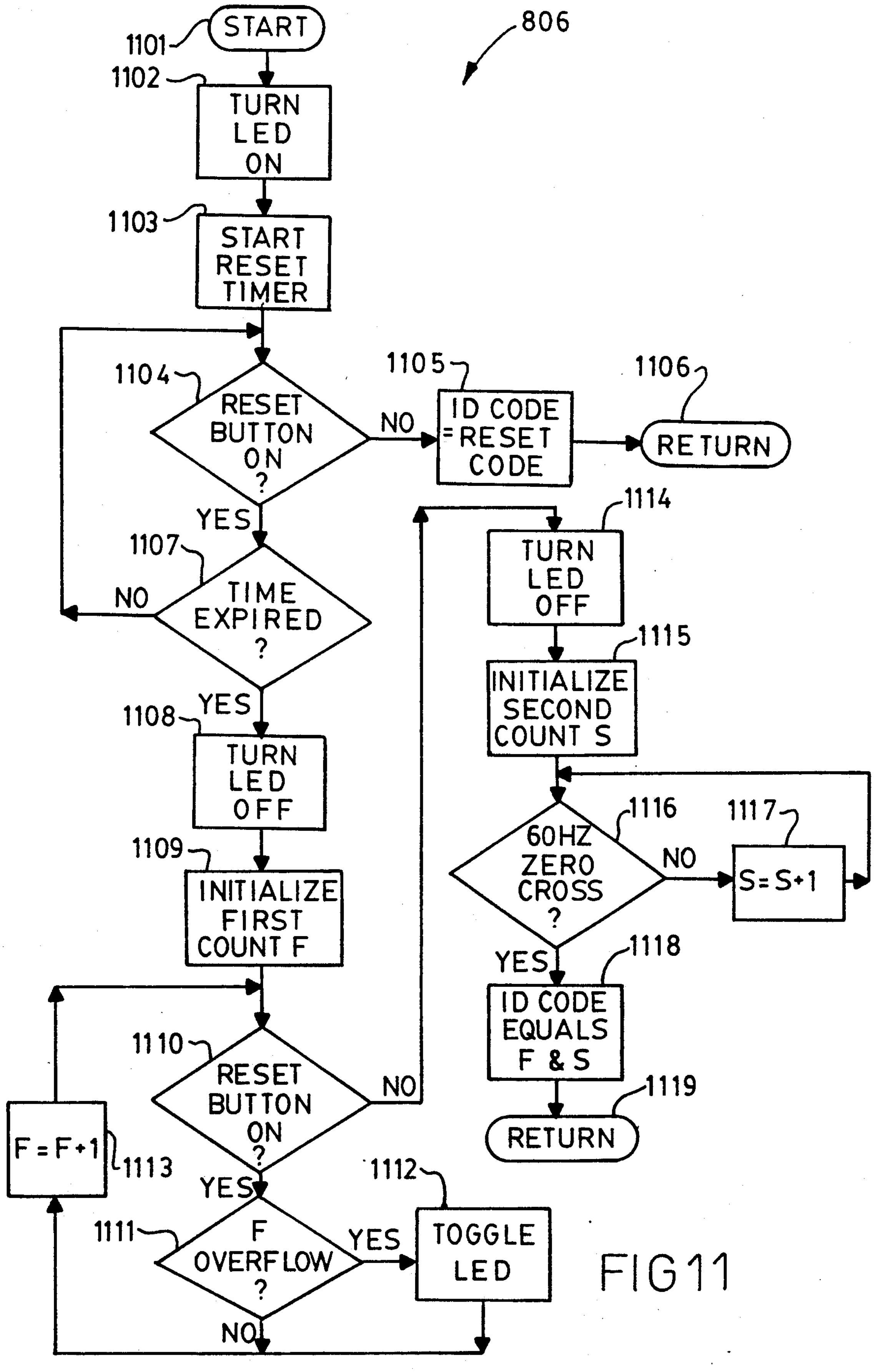
FIG. 11 is a flow chart illustrating the operation in which the identification code of the base unit is specified.

FIG. 11 illustrates in flow chart form identification code setting subroutine 806. The identification code setting subroutine 806 is actuated by depression of the identification code program button 703. Identification code setting subroutine 806 enables the operator to set either the reset code or a randomly selected code as the identification code of the base unit 700. Identification code setting subroutine 806 is entered via start block 1101. This subroutine first turns on light emitting diode 702 (processing block 1102). The subroutine then starts a reset timer (processing block 1103). Identification code setting subroutine 806 next tests to determine whether or not the identification code program button 703 is still pressed (decision block 1104). If this is not the case, that is if the identification code program button 703 has been pressed and released during the time of the reset timer, then the identification code is set equal to the predetermined reset code (processing block 1105). As explained above, this predetermined reset code is equal to 20 ones in the preferred embodiment. The identification code setting subroutine 806 is then complete and exited by return block 1106.

In the event that the identification code program button 703 is still depressed then identification code setting subroutine 806 tests to determine whether or not the reset timer has expired (decision block 1107). If this reset time has not expired then control returns to decision block 1104 to repeat the test on the condition of the identification code program button 703. The identification code setting subroutine 806 remains in this loop until either the identification code program button 703 is released (decision block 1104) or the reset time has expired (decision block 1107).

If the identification code program button 703 remains depressed during the entire reset time interval, the identification code setting subroutine 806 turns off light emitting diode 702 (processing block 1108). This indicates to the operator that the time interval during which the reset code can be set has now expired. Identification code setting subroutine 806 next initializes a first count F (processing block 1109). In accordance with the preferred embodiment, the first count F is set equal to a subset of the bits of the identification code. First count F is initialized by recalling the stored identification code and loading the subset of bits corresponding to the first count F into the counter.

Identification code setting subroutine 806 next enters a counting loop whose exit is dependent upon the state of the identification code program button 703. Firstly, identification code setting subroutine 806 tests to determined whether or not the identification code button 703 is still depressed (decision block 1110). If the identification code program button 703 is still depressed then identification code setting subroutine 806 tests to determine whether or not the count F has overflowed (decision block 1111). If this is the case then the On or Off state of the light emitting diode 702 is toggled (processing block 1112). In either case the first count F is incremented (processing block 1113). Control then returns to decision block 1110 to test to determine the state of the identification code program button 703. Identification code setting subroutine 806 remains in this loop until the identification code program button 703 is released (decision block 1110). Thus the value of first count F is dependent upon the length of time that the identification code program button 703 is depressed. Also note that the On or Off status of light emitting diode 702 changes each time first count F overflows.

Once the identification code program button 703 has been released, identification code setting subroutine 806 ensures that light emitting diode 702 is turned off (processing block 1114). Next a second count S is initialized (processing block 1115). In accordance with the preferred embodiment, the second count S is set equal to the remaining subset of the bits of the current identification code. Second count S is initialized by loading this remaining subset of bits into the counter.

Identification code setting subroutine 806 then tests to determine whether or not zero crossing detector 719 has detected the next zero crossing of the 60 hertz power (decision block 1116). If the next zero crossing has not been detected then the second count S is incremented (processing block 1117). Control returns to decision block 1116 for detection of the next zero crossing of the 60 hertz power. Control remains in this loop with the second counting variable S incremented until the zero crossing detector 719 determines the next zero crossing. When this zero crossing is detected identification code setting subroutine 806 sets the identification code of the base unit 700 equal to the concatenation of the first count F and the second count S (processing block 1118). Identification code setting subroutine 806 is now complete and is exited via return block 1119.

The system of the present invention permits very flexible implementation of a remote control security system. One envisioned embodiment uses the base unit 700 for control of an automatic garage door operator. The automatic garage door operator is connected to base unit 700 as one of the utilization devices 724 to 742. Once installed base unit 700 is taught a identification code in the manner just described. A plurality of portable units 200 can learn this identification code from the base unit 700. Then the automatic garage door operator is controlled by base unit 700 in accordance with the "four function" protocol. This "four function" protocol is known in the art and includes the states of: door opening; stop; door closing; and stop. The automatic garage door operator is advanced to the next state upon each receipt of a signal from the corresponding function driver 723 to 741.

A remote control security system can be configured in several ways using the present invention because each portable unit 200 is capable of storing a plurality of identification codes. A single portable unit could learn the identification code of a plurality of base units, permitting the single portable unit to operate each of several base units. This could be employed in a layered security system in which each of a number of portable units opens a primary gate, but only a single portable unit would open a particular one of a number of secondary gates. The capability of transmitting channel numbers corresponding to the control buttons pushed can be used to implement two level security systems for a single location such as taught in our prior U.S. Pat. No. 4,847,542, entitled "AUTOMATIC GARAGE DOOR OPERATOR WITH REMOTE LOAD CONTROL" issued Jul. 11, 1989. In such a system the portable units 200 transmit the identification code and channel 1 upon depression of control button A and the identification code and channel 2 upon depression of control button B. The base unit 700 operates function driver 723 to produce the door signal and function driver 725 to produce the secure signal in the manner disclosed in this prior application. In this embodiment control buttons C and D can be employed for additional signaling functions such toggling the state of a lamp or other controlled device. This lamp or other device may be located remotely from the base unit 700 and controlled via a modulated signal on the power supply mains as disclosed in the above mentioned prior patent application.

The present invention may also be advantageously employed in a security system. A number of portable units 200 may be taught a single identification code and disposed at the locations of windows or doors which are to be monitored. A magnetic reed switch or other switch controlled by the opening of the window or door is connected to input buffers 213 of application specific integrated circuit 210. It is preferable that each such switch be connected to activate a unique set of control inputs, thereby activating the transmission of a unique channel number. In addition, some portable units 200 can be coupled to activate a unique channel via smoke or fire alarms. Note that there are 15 such unique channel numbers available in the preferred embodiment described in this application. In this use it would be advantageous to employ the optional time out function at each portable unit 200 to minimize battery drain and to prevent continuous radio frequency transmissions. The base unit 700 thus has the information in the channel number regarding the identity of the open portal or the alarm tripped and can control one or more utilization devices in response to these signals.

Thus the present invention includes the advantages of: providing an easy manner for setting the identification code in the base unit and in each portable unit; storing the identification code in a manner not discernible by visual inspection; and providing a flexible system adaptable to numerous uses.

I claim:

1. A remote control system comprising:

at least one portable unit, each portable unit including a control input means for activating a control state from a set of at least one control state, at least one portable unit identification code memory, each portable unit identification code memory corresponding to one of said set of at least one control state for storing a corresponding identification code therein, a radio frequency transmitter connected to said control input means and said at least one portable unit identification code memory for transmitting a radio frequency signal encoded with said identification code stored in said portable unit identification code memory corresponding to said activated control state upon activation of one of said set of at least one control state via said control input means, an asynchronous communications reception port for asynchronously receiving data, an identification code learning means connected to said at least one portable unit identification code memory and said asynchronous communications reception port for storing an identification code in one of said at least one portable unit identification code memory corresponding to data received via said asynchronous communications reception port, and a memory reset means connected to said at least one portable unit identification code memory for storing a predetermined reset identification code in a selected one of said at least portable unit identification code memory when activated; and a base unit including a base unit identification code memory for storing an identification code therein, a radio frequency receiver connected to said base unit identification code memory for receiving said encoded radio frequency signal and generating a function signal only if said encoded radio frequency signal is encoded with said identification code stored in said base unit identification code memory, an asynchronous communications transmission port capable of mating with said asynchronous communications reception port for asynchronously transmitting data, an identification code teaching means connected to said base unit identification code memory and said asynchronous communications port for transmitting said base unit identification code stored in said base unit identification code memory via said asynchronous communications transmission port, and an identification code selection means connected to said base unit identification code memory and not activated in conjunction with the activation of said identification code teaching means for selecting an identification code for storage in said base unit identification code memory, said base unit identification code selection means further including a memory reset means for resetting said base unit identification code to said predetermined reset identification code;

whereby said identification code stored in said base unit identification code memory is taught to one of said at least one portable unit by connection of said asynchronous communications transmission port to said asynchronous communications reception port and activation of said identification code learning means and said identification code teaching means.

2. The remote control system claimed in claim 7, wherein:

said at least one portable unit wherein said set of at least one control state of said control input means consists of a plurality of control states, said at least one portable unit identification code memory consists of a plurality of portable unit identification code memories, and said identification code learning means is further connected to said control input means for detecting activation of one of said control states and for storing said identification code corresponding to data received via said asynchronous communications reception port in said portable unit identification code memory corresponding to said activated control state.

3. The remote control system claimed in claim 1, wherein:

said base unit identification code selection means includes a random identification code generator for producing a randomly selected identification code.

4. The remote control system claimed in claim 1, wherein:

said at least one portable unit wherein said set of at least one control state activated by said control input means consists of a predetermined plurality of control states, said at least one portable unit identification code memory consists of a plurality of portable unit identification code memories, and said memory reset means is further connected to said control input means, said memory reset means for storing said predetermined reset identification code in said portable identification code memory corresponding to said activated control state.

5. The remote control system claimed in claim 4, wherein:

said at least one portable unit wherein said memory reset means includes a memory reset push button, and wherein said memory reset means stores said predetermined reset identification code in said portable identification code memory corresponding to said activated control state upon simultaneous activation of one of said control states and depression of said memory reset push button.

6. The remote control system claimed in claim 1, further comprising:

at least one utilization device connected to said radio frequency receiver of said base unit for performing a predetermined function in response to receipt of said function signal from said radio frequency receiver.

7. A remote control system comprising:

at least one portable unit, each portable unit including a control input means for activating a control state from a set of a plurality of control states, a plurality of portable unit identification code memories, each portable unit identification code memory corresponding to one of said set of control states for storing a corresponding identification code therein, a radio frequency transmitter connected to said control input means and said plurality of portable unit identification code memories for transmitting a radio frequency signal encoded with a predetermined reset identification code and a predetermined channel number code if all of said portable unit identification code memories store said predetermined reset identification code, said identification code stored in a predetermined one of said portable unit identification code memories and a channel number code corresponding to said activated control states if plural control states are activated, said identification code stored in said predetermined one of said portable unit identification code memories and a channel number code corresponding to the single control state activated if a single control state is activated and said portable identification memory corresponding to said single control state activated stores said predetermined reset identification code, and said identification code stored in said portable unit identification code memory corresponding to said single control state activated and a predetermined channel number code if a single control state is activated and said portable identification memory corresponding to said single control state activated does not store said predetermined reset identification code, an asynchronous communications reception port for asynchronously receiving data, and an identification code learning means connected to said at plurality of portable unit identification code memories and said asynchronous communications reception port for storing an identification code in one of said plurality of portable unit identification code memories corresponding to data received via said asynchronous communications reception port; and a base unit including a base unit identification code memory for storing an identification code therein, a radio frequency receiver connected to said base unit identification code memory for receiving said encoded radio frequency signal and generating one of a plurality of function signals corresponding to said channel number code only if said encoded radio frequency signal is encoded with said identification code stored in said base unit identification code memory, an asynchronous communications transmission port capable of mating with said asynchronous communications reception port for asynchronously transmitting data, an identification code teaching means connected to said base unit identification code memory and said asynchronous communications port for transmitting said base unit identification code stored in said base unit identification code memory via said asynchronous communications transmission port, and an identification code selection means connected to said base unit identification code memory and not activated in conjunction with the activation of said identification code teaching means for selecting an identification code for storage in said base unit identification code memory;

whereby said identification code stored in said base unit identification code memory is selected by activation of said identification code selection means and is separately and independently taught to one of said at least one portable unit by connection of said asynchronous communications transmission port to said asynchronous communications reception port and activation of said identification code learning means and said identification code teaching means.

8. The remote control system claimed in claim 7, further comprising:

at least one utilization device connected to said radio frequency receiver of said base unit for performing a predetermined function corresponding to a received function signal in response to receipt of one of said plurality of function signals from said radio frequency receiver.

9. A remote control portable unit comprising:

a control input means for activating a control state from a set of at least one control state;

at least one identification code memory, each identification code memory corresponding to one of said set of at least one control state and for storing an identification code therein;

a radio frequency transmitter connected to said control input means and said at least one identification code memory for transmitting an radio frequency signal encoded with said identification code stored in said identification code memory corresponding to said activated control state upon activation of one of said set of at least one control state via said control input means;

an asynchronous communications reception port for asynchronously receiving data;

an identification code learning means connected to said at least one identification code memory and said asynchronous communications reception port for storing an identification code in one of said at least one identification code memory corresponding to data received via said asynchronous communications reception port; and a memory reset means connected to said at least one identification code memory for storing a predetermined reset identification code in one of said at least one identification code memory when activated;

whereby an identification code is learned from an external unit via said asynchronous communication reception port upon activation of said identification code learning means.

10. The remote control portable unit claimed in claim 9, further comprising:

an indicator device for producing an operator perceivable indication;

a signaling circuit connected to said radio frequency transmitter, said asynchronous communications reception port and said indicator device for causing said indicator device to produce said operation perceivable indication during operation of said radio frequency transmitter, and during operation of said asynchronous communications reception port.

11. The remote control portable unit claimed in claim 10, wherein:

said indicator device consists of a light emitting diode for producing a light signal.

12. The remote control portable unit claimed in claim 9, wherein:

said memory reset means if further connected to said control input means, said memory reset means for storing said predetermined reset identification code in said portable identification code memory corresponding to said activated control state.

13. The remote control portable unit claimed in claim 9, wherein:

said memory reset means includes a memory reset push button, and wherein said memory reset means stores said predetermined reset identification code in said portable identification code memory corresponding to said activated control state upon simultaneous activation of one of said control states and depression of said memory reset push button.

14. A remote control portable unit comprising:

a control input means for activating a control state from a set of a plurality of control states;

a plurality of identification code memories, each identification code memory corresponding to one of said set of control states and for storing an identification code therein;

a radio frequency transmitter connected to said control input means and said plurality of identification code memories for transmitting an radio frequency signal encoded with a predetermined reset identification code and a predetermined channel number code if all of said identification code memories store said predetermined reset identification code, said identification code stored in a predetermined one of said identification code memories and a channel number code corresponding to said activated control states if plurality control states are activated, said identification code stored in said predetermined one of said identification code memories and a channel number code corresponding to the single control state activated if a single control state is activated and said identification memory corresponding to said single control state activated stores said predetermined reset identification code, and said identification code stored in said identification code memory corresponding to said single control state activated and a predetermined channel number code if a single control state is activated and said identification memory corresponding to said single control state activated does not store said predetermined reset identification code;

an asynchronous communications reception port for asynchronously receiving data; and an identification code learning means connected to said plurality of identification code memories and said asynchronous communications reception port for storing an identification code in one of said plurality of identification code memories corresponding to data received via said asynchronous communications reception port;

whereby an identification code is learned from an external unit via said asynchronous communication reception port upon activation of said identification code learning means.

15. A remote control base unit comprising:

a identification code memory for storing an identification code therein;

a radio frequency receiver connected to said identification code memory for receiving a radio frequency signal and generating a function signal only if said radio frequency signal is encoded with said identification code stored in said identification code memory;

an asynchronous communications transmission port for asynchronously transmitting data;

an identification code teaching means connected to said identification code memory and said asynchronous communications port for transmitting said identification code stored in said identification code memory via said asynchronous communications port; and an identification code selection means including a manually operable momentary contact push button switch, a first counting means connected to said push button switch, capable of counting up to a first predetermined number having a first number of bits, a time base means for providing a repetitive time signal, a second counting means connected to said push button switch and said time base means capable of counting up a second predetermined number having a second number of bits once each interval of said repetitive time signal, the sum of said first number of bits and said second number of bits being equal to the number of bits in said identification code, and an identification code selection controller means connected to said push button switch, and said first and said second counting means for activating said first counting means to count upon depression of said push button switch, stopping said first counting means upon release of said push button switch thereby producing a first count, thereafter activating said second counting means to count, stopping said second counting means upon receipt of the next repetitive time signal, thereby producing a second count, and producing said identification code corresponding to said first and second counts;

whereby said identification code stored in said identification code memory is taught to an external device via said asynchronous communications transmission port upon activation of said identification code teaching means.

16. The remote control base unit claimed in claim 15, wherein:

said identification code selection means further includes a light emitting diode connected to said first counting means for indicating when said first counting means counts up to said first predetermined number.

17. The remote control base unit claimed in claim 16, wherein:

said light emitting diode indicates when said first counting means counts up to said first predetermined number by alternately changing from being illuminated to not being illuminated and changing from not being illuminated to being illuminated when said first counting means counts up to said first predetermined number.

18. A remote control base unit comprising:

a identification code memory for storing an identification code therein;

a radio frequency receiver connected to said identification code memory for receiving a radio frequency signal and generating a function signal only if said radio frequency signal is encoded with said identification code stored in said identification code memory;

an asynchronous communications transmission port for asynchronously transmitting data;

an identification code teaching means connected to said identification code memory and said asynchronous communications port for transmitting said identification code stored in said identification code memory via said asynchronous communications port; and an identification code selection means connected to said identification code memory and not activated in conjunction with the activation of said identification code teaching means for selecting an identification code for storage in said identification code memory, said identification code selection means further including a memory reset means for resetting said identification code to a predetermined reset identification code;

whereby said identification code stored in said identification code memory is taught to an external device via said asynchronous communications transmission port upon activation of said identification code teaching means.

19. The remote control base unit claimed in claim 18, wherein:

said memory reset means includes a memory reset push button, and wherein said memory reset means stores said predetermined reset identification code in said identification code memory upon depression of said memory reset push button.

20. A remote control base unit comprising:

a identification code memory for storing an identification code therein;

a radio frequency receiver connected to said identification code memory for receiving a radio frequency signal and generating a function signal only if said radio frequency signal is encoded with said identification code stored in said identification code memory;

an asynchronous communications transmission port for asynchronously transmitting data;

an identification code teaching means connected to said identification code memory and said asynchronous communications port for transmitting said identification code stored in said identification code memory via said asynchronous communications port; and an identification code selection means including a manually operable momentary contact push button switch, a light emitting diode, a first counting means connected to said push button switch, capable of counting up to a first predetermined number having a first number of bits, a time base means for providing a repetitive time signal, a second counting means connected to said push button switch and said time base means capable of counting up a second predetermined number having a second number of bits once each interval of said repetitive time signal, the sum of said first number of bits and said second number of bits being equal to the number of bits in said identification code, and an identification code selection controller means connected to said push button switch, said light emitting diode, and said first and said second counting means for illuminating said light emitting diode and beginning a predetermined reset interval of time upon depression of said push button switch, if said push button is released during said reset interval, producing said identification code corresponding to a predetermined reset identification code, if said push button is not released during said reset interval, extinguishing said light emitting diode and activating said first counting means to count, stopping said first counting means upon release of said push button switch thereby producing a first count, thereafter activating said second counting means to count, stopping said second counting means upon receipt of the next repetitive time signal, thereby producing a second count and producing said identification code corresponding to said first and second counts;

whereby said identification code stored in said identification code memory is taught to an external device via said asynchronous communications transmission port upon activation of said identification code teaching means.

21. A remote control base unit comprising:

a identification code memory for storing an identification code therein;

a radio frequency receiver connected to said identification code memory for receiving a radio frequency signal and generating a function signal only if said radio frequency signal is encoded with said identification code stored in said identification code memory;

an asynchronous communications transmission port for asynchronously transmitting data;

an identification code teaching means connected to said identification code memory and said asynchronous communications port for transmitting said identification code stored in said identification code memory via said asynchronous communications port; and at least one utilization device connected to said radio frequency receiver for performing a predetermined function in response to receipt of said function signal from said radio frequency receiver;

whereby said identification code stored in said identification code memory is taught to an external device via said asynchronous communications transmission port upon activation of said identification code teaching means.

22. A remote control base unit comprising:

a identification code memory for storing an identification code therein;

a radio frequency receiver connected to said identification code memory for receiving a radio frequency signal and generating one of a plurality of function signals corresponding to a channel number code only if said radio frequency signal is encoded with said identification code stored in said identification code memory and said channel number code;

an asynchronous communications transmission port for asynchronously transmitting data;

an identification code teaching means connected to said identification code memory and said asynchronous communications port for transmitting said identification code stored in said identification code memory via said asynchronous communications port; and at least one utilization device connected to said radio frequency receiver for performing a predetermined function corresponding to said channel number code received by said radio frequency receiver;

whereby said identification code stored in said identification code memory is taught to an external device via said asynchronous communications transmission port upon activation of said identification code teaching means.

23. A remote control base unit comprising:

a identification code memory for storing an identification code therein, said identification code memory consisting of a nonvolatile memory which retains said identification code stored therein upon removal of electric power;

a radio frequency receiver connected to said identification code memory for receiving a radio frequency signal and generating a function signal only if said radio frequency signal is encoded with said identification code stored in said identification code memory;

an asynchronous communications transmission port for asynchronously transmitting data; and an identification code teaching means connected to said identification code memory and said asynchronous communications port for transmitting said identification code stored in said identification code memory via said asynchronous communications port;

whereby said identification code stored in said identification code memory is taught to an external device via said asynchronous communications transmission port upon activation of said identification code teaching means.

24. The remote control base unit claimed in claim 23, wherein:

said nonvolatile memory consists of electrically erasable programmable read only memory.

* * * * *